US009726221B2

(12) United States Patent
Kovach et al.

(10) Patent No.: US 9,726,221 B2
(45) Date of Patent: Aug. 8, 2017

(54) GEAR PUMP BEARINGS WITH HYBRID PADS

(71) Applicant: Hamilton Sundstrand Corporation, Charlotte, NC (US)

(72) Inventors: Brandon T. Kovach, Rockford, IL (US); Steven A. Heitz, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 264 days.

(21) Appl. No.: 14/531,388

(22) Filed: Nov. 3, 2014

(65) Prior Publication Data

US 2016/0032969 A1 Feb. 4, 2016

Related U.S. Application Data

(63) Continuation-in-part of application No. 14/448,552, filed on Jul. 31, 2014.

(51) Int. Cl.
*F04C 2/12* (2006.01)
*F04C 18/14* (2006.01)
(Continued)

(52) U.S. Cl.
CPC .......... *F16C 32/0666* (2013.01); *F01C 21/02* (2013.01); *F04C 2/18* (2013.01);
(Continued)

(58) Field of Classification Search
CPC ...... F01C 21/02; F04C 15/0061; F04C 18/14; F04C 2/12; F04C 2/14; F04C 29/005; F04C 2240/54
(Continued)

(56) References Cited

U.S. PATENT DOCUMENTS 2,479,077 A    8/1949   McAlvay
3,528,756 A    9/1970   Norlin et al.
(Continued)

FOREIGN PATENT DOCUMENTS

EP    0310292 A2    4/1989
EP    1890045 A1    2/2008
(Continued)

OTHER PUBLICATIONS

European Search Report for European Application No. 15178793.4, dated Dec. 9, 2015, 10 pages.
(Continued)

*Primary Examiner* — Nicholas J Weiss
*Assistant Examiner* — Dapinder Singh
(74) *Attorney, Agent, or Firm* — Kinney & Lange, P.A.

(57) ABSTRACT

A journal bearing assembly includes a first journal bearing disposed about a longitudinal end of a gear shaft and spaced a first distance from a first axial gear face. A first fluid film location and a first hybrid pad location are annularly between an inner surface of the first journal bearing and an outer surface of the gear shaft. The first hybrid pad location circumferentially adjacent to the first fluid film location has a minimum leading edge angular location of at least about 31.0° measured relative to a first bearing flat. A first porting path provides high pressure fluid communication from a location outside the first journal bearing to the first fluid film location at or adjacent to the first hybrid pad location.

17 Claims, 13 Drawing Sheets

(51) Int. Cl.
  *F04C 29/00* (2006.01)
  *F04C 15/00* (2006.01)
  *F01C 21/02* (2006.01)
  *F16C 32/06* (2006.01)
  *F04C 2/18* (2006.01)
  *F04C 2/08* (2006.01)

(52) U.S. Cl.
  CPC .......... *F16C 32/0659* (2013.01); *F04C 2/086* (2013.01); *F04C 15/0088* (2013.01); *F04C 2240/54* (2013.01); *F04C 2240/605* (2013.01)

(58) Field of Classification Search
  USPC .................................. 418/73, 75, 79, 80, 102
  See application file for complete search history.

(56) References Cited

U.S. PATENT DOCUMENTS

| | | |
|---|---|---|
| 4,289,460 A | 9/1981 | Noell et al. |
| 2016/0032969 A1 | 2/2016 | Kovach et al. |

FOREIGN PATENT DOCUMENTS

| | | |
|---|---|---|
| EP | 2672119 A1 | 12/2013 |
| EP | 2 700 831 A1 | 2/2014 |
| EP | 2980353 A1 | 7/2015 |
| GB | 883356 | 11/1961 |

OTHER PUBLICATIONS

Combined Search and Examination Report, for British Patent Application No. GB1519403.8, dated May 13, 2016, 8 pages.

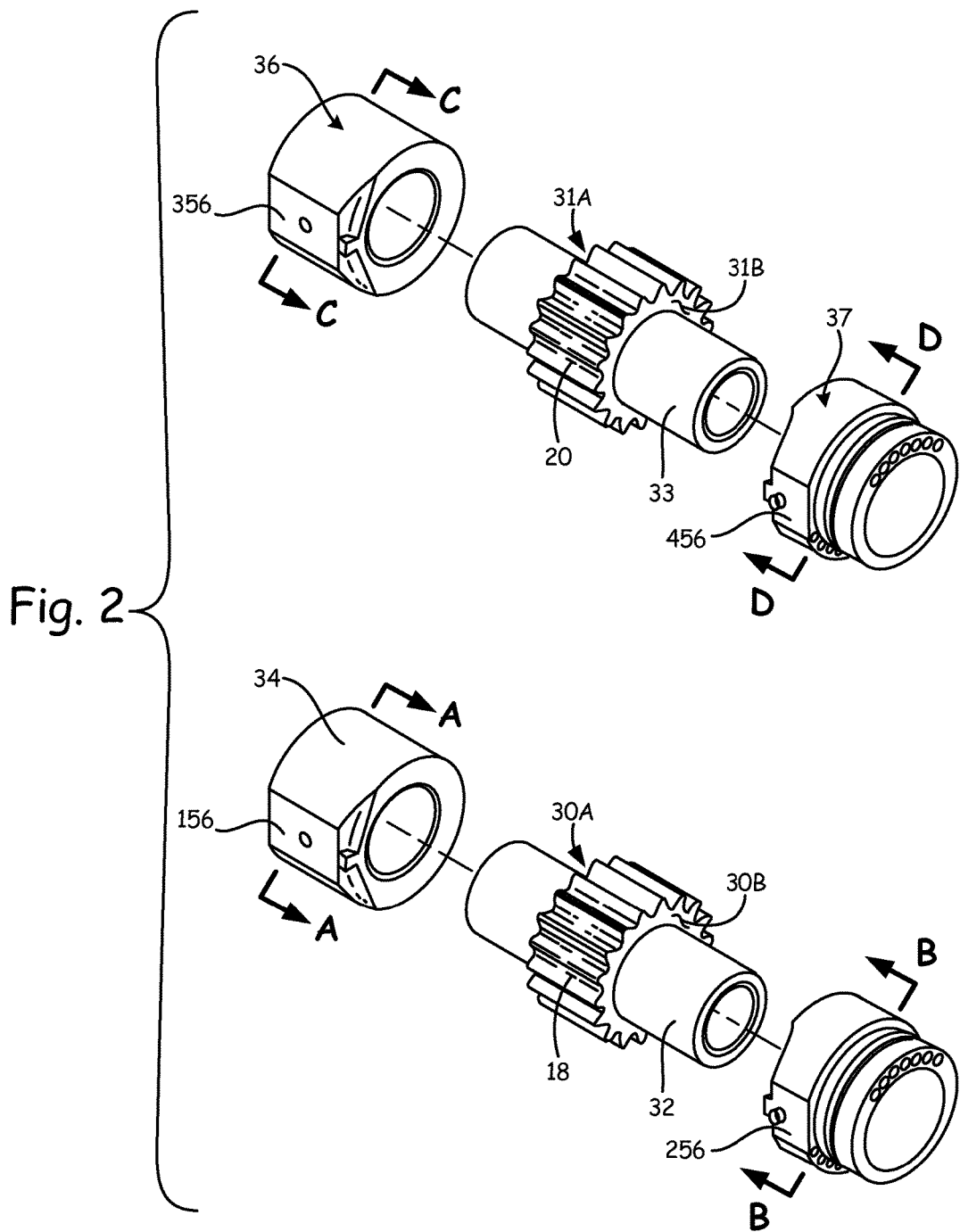

GEAR PUMP BEARINGS WITH HYBRID PADS

CROSS-REFERENCE TO RELATED APPLICATIONS

This application is a continuation-in-part application of U.S. patent application Ser. No. 14/448,552, entitled "GEAR PUMP DRIVE GEAR STATIONARY BEARING" filed on Jul. 31, 2014. This application is incorporated herein by reference in its entirety.

BACKGROUND

The present embodiments relate generally to gear pumps and, more particularly, to journal bearings for a gear pump.

A gear pump operates to pump fluid from an inlet to an outlet. Generally, a gear pump utilizes multiple gears, including a drive gear and a driven gear, each with respective teeth. The drive gear is rotated, and in turn rotates the driven gear at a location where the respective teeth mesh. Fluid enters the inlet and travels between the teeth of the drive gear and a housing, and the teeth of the driven gear and the housing. As the gears turn, the fluid is pulled towards the outlet and squeezed out of the pump due to a pressure differential between the inlet and outlet.

Both the drive gear and the driven gear are supported within the gear pump by respective gear shafts. Each gear shaft is in turn supported by both a pressure loaded journal bearing and a stationary journal bearing, both of which react the load of the gear shaft. The gear shaft load is carried by both the stationary and pressure loaded journal bearings through a fluid film pressure in each journal bearing, between a surface of the gear shaft and a surface of the journal bearing. Bearings such as these, which support their loads on a layer of liquid, are known as hydrodynamic bearings. Pressure develops in the fluid film as a result of a velocity gradient between the rotating surface of the gear shaft and the surface of the journal bearing (i.e., a viscosity of the fluid resists a shearing action of the velocity gradient).

A conventional hydrodynamic bearing will operate at a fluid film thickness at which the film pressure in the journal bearing reacts the loads applied to the gear and gear shaft. However, for a given operating condition, as the loads continue to increase the fluid film thickness will continue to reduce until the surfaces of the gear shaft and the journal bearing physically contact one another. This is referred to as a "bearing touchdown," and can cause damage, decreased performance, or catastrophic failure of the gear pump. One solution for increasing the load carrying capacity of a given hydrodynamic journal bearing is to increase a size of the journal bearing. However, in certain gear pump applications operating and/or weight requirements do not permit the use of a larger and/or heavier journal bearing.

SUMMARY

An example embodiment of a journal bearing assembly includes a gear mounted to the gear shaft, a first journal bearing disposed about a longitudinal end of the gear shaft and spaced a first distance from a first axial gear face, a first hybrid pad location circumferentially adjacent to a first fluid film location, and a first porting path through a body of the first journal bearing. The first fluid film location is annularly between an inner surface of the first journal bearing and an outer surface of the gear shaft. The first hybrid pad location circumferentially adjacent to the first fluid film location has a minimum leading edge angular location of at least about 31.0° measured relative to a first bearing flat. The first porting path provides high pressure fluid communication from a location outside the first journal bearing to the first fluid film location at or adjacent to the first hybrid pad location.

Another example embodiment of a journal bearing assembly includes a gear mounted to the gear shaft, a first journal bearing disposed about a longitudinal end of the gear shaft and spaced a first distance from a first axial gear face, a first hybrid pad location circumferentially adjacent to a first fluid film location, and a first porting path through a body of the first journal bearing. The first fluid film location is annularly between an inner surface of the first journal bearing and an outer surface of the gear shaft. The first hybrid pad location circumferentially adjacent to the first fluid film location has a maximum trailing edge angular location of no more than about 52.0° measured relative to the first bearing flat. The first porting path provides high pressure fluid communication from a location outside the first journal bearing to the first fluid film location at or adjacent to the first hybrid pad location.

BRIEF DESCRIPTION OF THE DRAWINGS

FIG. 2 is an exploded perspective view of a gear pump including a drive gear, a pair of drive-side bearings, a driven gear and a pair of driven-side bearings.

Figure 1:
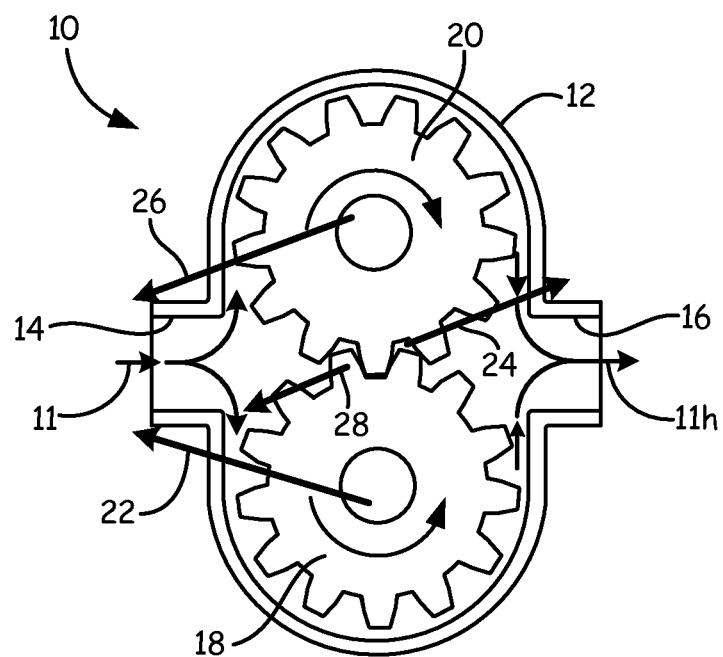
FIG. 1 is a schematic, cross-sectional view of a gear pump showing the approximate direction of loads affecting both drive and driven gears of the gear pump.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, in a gear pump with journal bearings supporting drive gear and driven gear assemblies, load carrying capacities of the journal bearings can be increased without increasing a size of the bearings. This can be done, for example, by supplying high pressure fluid to generate a hybrid pad at a location annularly between an inner surface of the journal bearing and the corresponding (drive or driven) gear shaft. The hybrid pad is formed at the annular location on the journal bearing(s), and feeds or refreshes a fluid film at an adjacent fluid film location. The high pressure fluid, such as from a discharge or outlet of the gear pump, can be supplied to the hybrid pad location and in turn the fluid film location. This can allow the fluid film, and thus the journal bearing(s), to support an increased load, while at the same time meeting stringent gear pump operating and/or weight requirements. Locations of the hybrid pad on each journal bearing is critical for successfully increasing load carrying capacity of the each journal bearing without compromising gear pump flow requirements.

FIG. 1 is a schematic, cross-sectional view of an embodiment of gear pump 10. Gear pump 10 includes fluid 11, high pressure fluid 11h, gear pump housing 12, gear pump inlet 14 (sometimes referred to as the front of gear pump 10), gear pump outlet 16 (sometimes referred to as the rear of gear pump), drive gear 18, and driven gear 20. Drive gear 18 experiences radial pressure load 22 and power transfer reaction load 24, whereas driven gear 20 experiences radial pressure load 26 and power transfer reaction load 28.

Gear pump 10 can operate to pump fluid 11 at a constant rate from inlet 14 to outlet 16. Fluid 11 enters housing 12 at inlet 14. Using a relatively low supplied inlet pressure, fluid 11 fills into gaps between teeth of drive gear 18 and housing 12, and teeth of driven gear 20 and housing 12. Drive gear 18 is rotated, in a counterclockwise direction in the illustrated embodiment, which in turn rotates driven gear 20, in a clockwise direction in the illustrated embodiment. As gears 18 and 20 turn, fluid 11 is moved toward relatively high pressure outlet 16 and squeezed out from housing 12 as high pressure fluid 11h. Fluid 11 (and 11h) and fluid film 152 (shown in FIG. 4A) can be, for example, Jet A or Jet A-1 fuel, which is at a temperature of approximately 300° F. (149° C.) when entering inlet 14 of gear pump 10.

For a given gear pump 10, drive gear 18 and driven gear 20 experience different loading. For example, drive gear 18 experiences radial pressure load 22 and power transfer reaction load 24 in the directions shown in FIG. 1. Radial pressure load 22 results from a pressure gradient of fluid 11 (i.e., low pressure at inlet 14 and high pressure at outlet 16), and power transfer reaction load 24 results from resistance of driven gear 20 which is rotated by drive gear 18. Driven gear 20 experiences radial pressure load 26 and power transfer reaction load 28 in the directions shown in FIG. 1. Radial pressure load 26 similarly results from fluid 11 pressure gradient, and power transfer reaction load 28 results from driven gear 20 being pushed by drive gear 18.

Because drive gear 18 and driven gear 20 experience different loading, the respective journal bearings which support each gear 18 and 20, via respective gear shafts (shown in FIG. 2) of each gear 18 and 20, also experience different loading. Therefore, because of the differing loads on each of the at least four bearings, the structure for increasing the load carrying capacity of each journal bearing is also specific to each supporting journal bearing. Thus, the discussion to follow will specifically address each of the plurality of journal bearings which support drive gear 18 and driven gear 20.

FIG. 2 is an exploded, perspective view of drive gear 18 and driven gear 20. As was also shown in FIG. 1, drive gear 18 is meshable with driven gear 20, which are respectively mounted to drive gear shaft 32 and driven gear shaft 33.

Drive gear 18 has axially opposed gear faces 30A, 30B and is mounted to a first (or drive) gear shaft 32, supporting drive gear 18 in gear pump 10. Similarly, driven gear 20 has axially opposed gear faces 31A, 31B and is mounted to a second (or driven) gear shaft 33, supporting driven gear 20 in gear pump 10. To form one journal bearing assembly, one or both longitudinal ends of first, or drive-side, gear shaft 32, can be respectively received in central recesses of drive-side stationary journal bearing 34 and drive-side pressure loaded journal bearing 35. Another journal bearing assembly can include one or both longitudinal ends of second, or driven-side, gear shaft 33, which are in turn respectively received by driven-side stationary journal bearing 36 and driven-side pressure loaded journal bearing 37. Each pair of journal bearings can thus respectively support drive-side gear shaft 32 and/or driven-side gear shaft 33.

Sectional views A-A, B-B, C-C, and D-D are respectively taken through the cylindrical body of each bearing 34, 35, 36, 37 as well as respective shafts 32, 33, shown in FIG. 2. FIG. 2 also shows bearing flats 156, 256, 256, 456, which respectively form a portion of the otherwise generally circumferential outer surfaces of the cylindrical bearing bodies, and from which relative angular locations of internal and external bearing features can be measured.

Stationary journal bearings 34, 36 are each fixed in place, for example, against housing 12 (shown in FIG. 1), whereas pressure loaded (or "floating") journal bearings 35, 37 can translate axially relative to respective gear shafts 32, 33. Loads experienced by drive gear 18, as shown in FIG. 1, are transferred to gear shaft 32. Since drive-side stationary journal bearing 34 and drive-side pressure loaded journal bearing 35 react the loads experienced by gear shaft 32, bearings 34, 35 also react many of the loads experienced by drive gear 18. Similarly, loads experienced by driven gear 20, also shown in FIG. 1, are transferred to gear shaft 33. And since driven-side stationary journal bearing 35 and driven-side pressure loaded journal bearing 36 react the loads second gear shaft 33, bearings 36, 37 also react many of the loads experienced by driven gear 20.

Each pair of bearings, disposed at opposing longitudinal ends of respective gear shafts 32, 33, carries shaft loads through a fluid film located between an inner surface of each bearing and an outer surface of each gear shaft. The fluid film can be supplemented by a hybrid pad as discussed below.

Figure 3A:
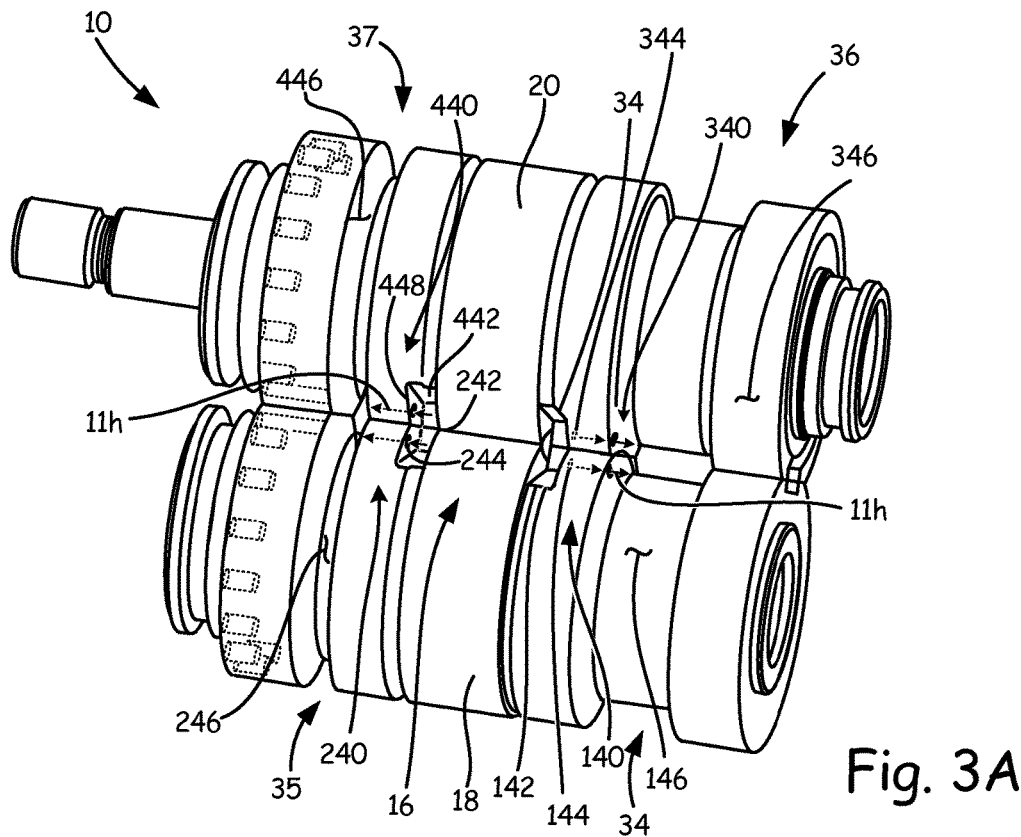
FIGS. 3A and 3B are schematic perspective views of a gear pump illustrating a plurality of porting paths.
Figure 3B:
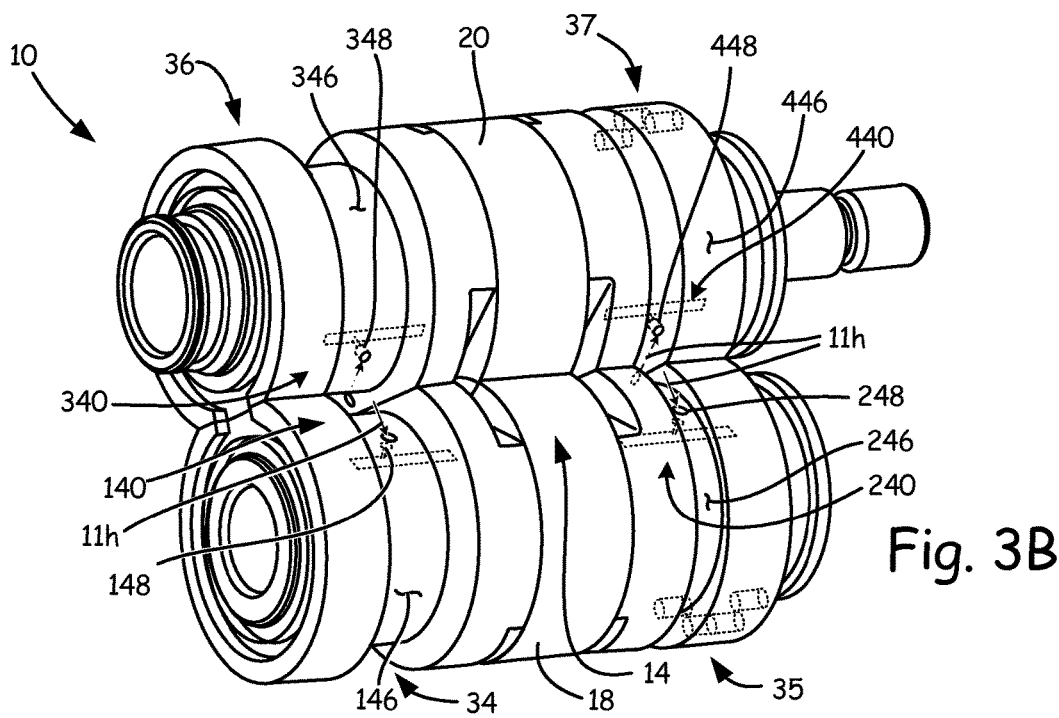

FIG. 3A is a schematic, rear perspective view of a portion of gear pump 10 illustrating first portions of porting paths 140, 240, 340, and 440, while FIG. 3B is a schematic, front perspective view of a portion of gear pump 10 illustrating second portions of porting paths 140, 240, 340, and 440. For simplicity of illustration, FIGS. 3A and 3B do not specifically show details of teeth on gears 18, 20. Porting paths 140, 240, 340, 440 each lead from a high-pressure fluid source (such as a discharge of gear pump 10) to hybrid pad recess locations 151, 251, 351, 451 for respective ones of each of at least four bearings 34, 35, 36, 37. Generally, a porting path (140, 240, 340, 440) leading to and through each bearing (34, 35, 36, 37) includes a discharge face cut (142, 242, 342, 442), an axial hole (144, 244, 344, 444), a radial spool cut (146, 246, 346, 446), and a capillary port(148, 248, 348, 448) so that high-pressure fluid 11h from the pump discharge outlet 16 can be sent to the individual hybrid pad recess locations 151, 251, 351, 451 on each of the bearings. Details of the porting paths for each bearing, as well as each hybrid pad recess location, will be shown and described in turn.

Drive-side Stationary Journal Bearing 34

Figure 4A:
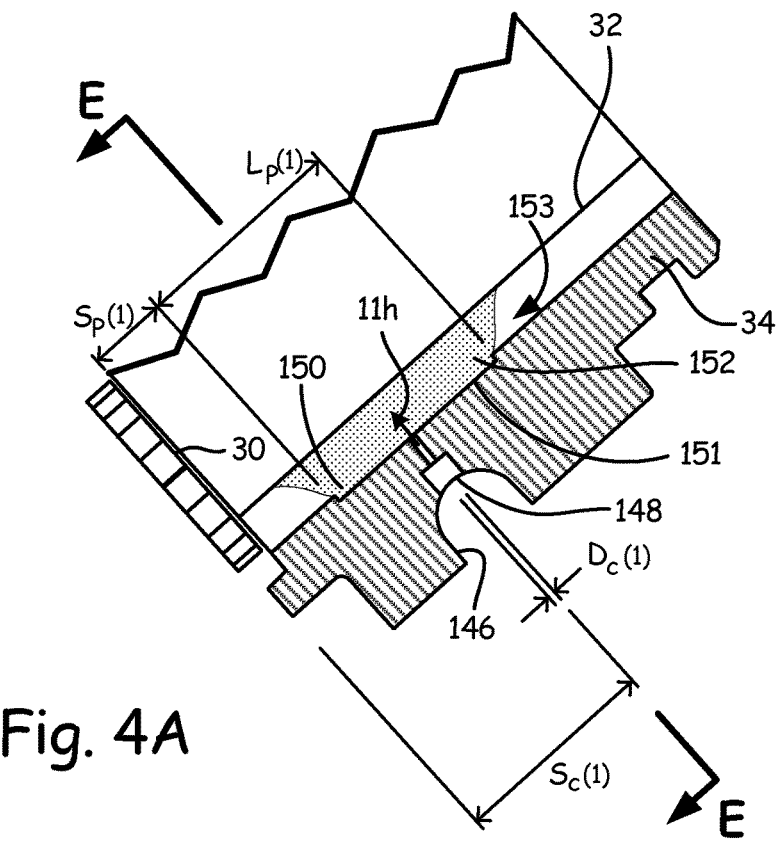
FIG. 4A is a cross-sectional view of a drive-side stationary journal bearing taken along line A-A of FIG. 2.
Figure 4B:
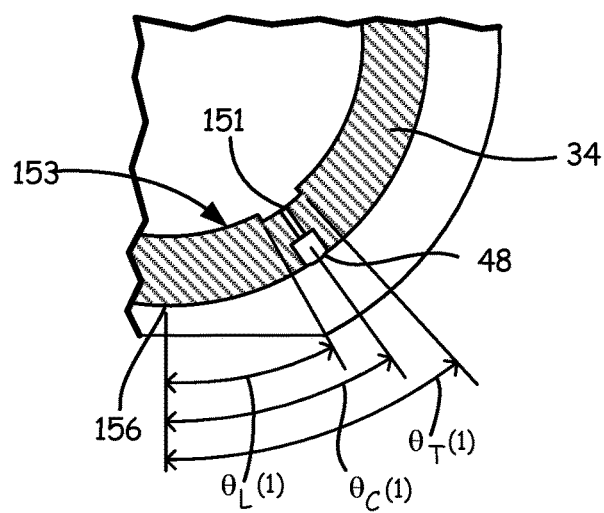
FIG. 4B is another cross-sectional view of the drive-side stationary journal bearing taken along line E-E of FIG. 4A.

FIGS. 4A and 4B are cross-sectional views of drive-side stationary journal bearing 34. In the example shown, drive-side stationary journal bearing 34 is a first of a plurality of bearings which can be used for supporting portions of gear pump 10. The sectional view in FIG. 4A is taken along line A-A of FIG. 2, while FIG. 4B is taken along line E-E of FIG. 4A.

First porting path 140 can be made up of first discharge face cut 142 (shown in FIG. 3A) on drive-side stationary journal bearing 34, first axial hole 144 (also shown in FIG. 3A) through bearing 34, first radial spool cut 146 on bearing 34, and first capillary port 148. First capillary port 148 can have diameter $D_C(1)$, as well as axial spacing $S_C(1)$ (measured from gear face 30A) and capillary port angular location $\theta_C(1)$ (measured from first bearing flat 156 shown in FIG. 2). As also shown below, first hybrid pad 150 and its corresponding first hybrid pad recess location 151 can have axial length $L_P(1)$ and axial spacing $S_P(1)$ (spacing measured from gear face 30A), while an angular location for hybrid pad 150 and hybrid pad recess 151 can be defined at least in part via leading edge angular location $\theta_L(1)$, and trailing edge angular location $\theta_T(1)$. Unless otherwise specified, all angular locations are referenced relative to a center of a corresponding bearing flat 156 (i.e. zero degrees), in the direction of shaft rotation (i.e. towards inlet 14, away from outlet 16).

Load carrying capacity of a first one of a plurality of journal bearings, drive-side stationary journal bearing 34, can be increased by delivering high pressure fluid 11h from outlet 16 to form first hybrid pad 150 at a corresponding first hybrid pad recess location 151. To form first hybrid pad 150 at or around particular hybrid pad recess location(s) 151 proximate or adjacent to fluid film location 153, a portion of the high-pressure fluid 11h exiting from outlet 16 can be supplied through porting path 140. Specifically, high-pressure fluid 11h discharges from outlet 16 at first discharge face cut 142 and pass through first axial hole 144 (both shown in FIG. 3A), to first radial spool cut 146. Once at first radial spool cut 146, fluid 11h then travels circumferentially around first radial spool cut 146 and into first capillary port 148, as shown in FIG. 3B.

As shown in FIGS. 3B, 4A, and 4B, first capillary port 148 can extend through drive-side stationary journal bearing 34 from first radial spool cut 146 to form first hybrid pad 150. First hybrid pad 150 has a corresponding first hybrid pad recess location 151 where high pressure fluid 11h can be injected, in use, to supplement fluid film 152 at fluid film location 153. Therefore, when high-pressure fluid 11h enters into first capillary port 148 from first radial spool cut 146, it can be delivered to a first hybrid pad recess location 151 for first hybrid pad 150. In the illustrated embodiment, first capillary port 148 has on-center axial spacing $S_C(1)$ of approximately 0.593 inch (1.506 cm) from first drive gear face 30A and diameter $D_C(1)$ of approximately 0.023 inch (0.058 cm). However, manufacturing tolerances for diameter $D_C(1)$ can include up to +0.004 inch (0.010 cm). First capillary port 148 can be in fluid communication with first hybrid pad 150 anywhere along the first hybrid pad recess location 151. For example, first capillary port 148 can be configured so as to be centered on first hybrid pad 150 and/or first hybrid pad recess location 151, or as shown in the first illustrated embodiment, first capillary port 148 can be configured to be offset from a center of first hybrid pad 150 and/or first hybrid pad recess location 151. As shown in this example, first capillary port 148 is centered only slightly offset from a center of first hybrid pad 150 (and its corresponding recess location 151) because first capillary port 148 can be located at or near where it is most cost-effective to machine, given a geometry of bearing 34.

In the illustrated embodiment, first hybrid pad 150 (and corresponding first recess location 151) has axial length $L_P(1)$ of approximately 0.675 inch (1.71 cm). It also has first axial spacing $S_P(1)$ of approximately 0.30 inch (0.76 cm) from first drive gear face 30A as measured from an edge of first hybrid pad 150 closest to first drive gear face 30A. However, manufacturing tolerances for first axial length $L_P(1)$ and first axial spacing $S_P(1)$ can include ±0.01 inch (0.025 cm). A configuration of first hybrid pad 150 is critical to successfully achieve increased load carrying capacity on drive-side stationary journal bearing 34. First hybrid pad 150 has a corresponding recess location 151 such that first hybrid pad 150 has a minimum leading edge angular location ($\theta_{Lmin}(1)$) of 31.0°, and a maximum trailing edge angular location ($\theta_{Tmax}(1)$) of 43.0° (i.e., all of first hybrid pad 150 is within an angular location range of 31.0°-43.0°, but need not extend fully within this range). In one embodiment (shown in FIG. 4B), first hybrid pad 150 extends fully within the angular location range of 31.0°-43.0°, such that $\theta_{Lmin}(1)$ is equal to $\theta_L(1)$ and $\theta_{Tmax}(1)$ is equal to $\theta_T(1)$. In other embodiments, first hybrid pad 150 can have a leading edge angular location $\theta_L(1)$ of 32°, and a trailing edge angular location $\theta_T(1)$ of 42°. In yet further embodiments, first hybrid pad 150 can have a leading edge angular location $\theta_L(1)$ of 35°, and a trailing edge angular location $\theta_T(1)$ of 39°. As shown, first hybrid pad 150 is centered at angular location $\theta_P(1)$ of 37° (shown in FIG. 5). More generally, to provide suitable film augmentation with maximum acceptable leakage in gear pump applications, other embodiments can have an overall first hybrid pad 150 width of about 8°-12°, and/or first hybrid pad 150 can be centered at locations other than 37° as long as all of first hybrid pad 150 is axially located within the angular location range of 31.0°-43.0°. With first hybrid pad 150 in an angular location range of 31.0°-43.0°, first capillary port 148 has angular location $\theta_C(1)$ on bearing 34 of approximately 37.0°, as measured from a centerline of first bearing flat 156.

In use, first fluid film 152, as shown in FIG. 4A, can be disposed at first fluid film location 153 between a surface of drive-side stationary journal bearing 34 and a surface of gear shaft 33. Fluid 11 is used to create fluid film 152, because as gear pump 10 begins to operate, a portion of fluid 11 from within housing 12 is axially drawn to location 153 shown in FIG. 4A. Bearing 34 supports one longitudinal end of first gear shaft 32 by reacting loads applied by this end of first gear shaft 32 through fluid film 152. By injecting high pressure fluid 11h into first hybrid pad 150, adjacent to fluid film location 153, first fluid film 152 is supplemented, and the resulting pressure of is increased compared to a baseline pressure of fluid film 152 drawn from housing 12 alone, and therefore, the load carrying capacity of drive-side stationary journal bearing 34 is increased compared to conventional gear pump bearings. In the illustrated embodiment, pressurizing or supplementing fluid film 152 with high pressure fluid 11h increases a thickness of fluid film 152 by approximately 0.000012 inch (0.000030 cm), and as a result, bearing 34 can carry greater loads without risk of a bearing touchdown.

Figure 5:
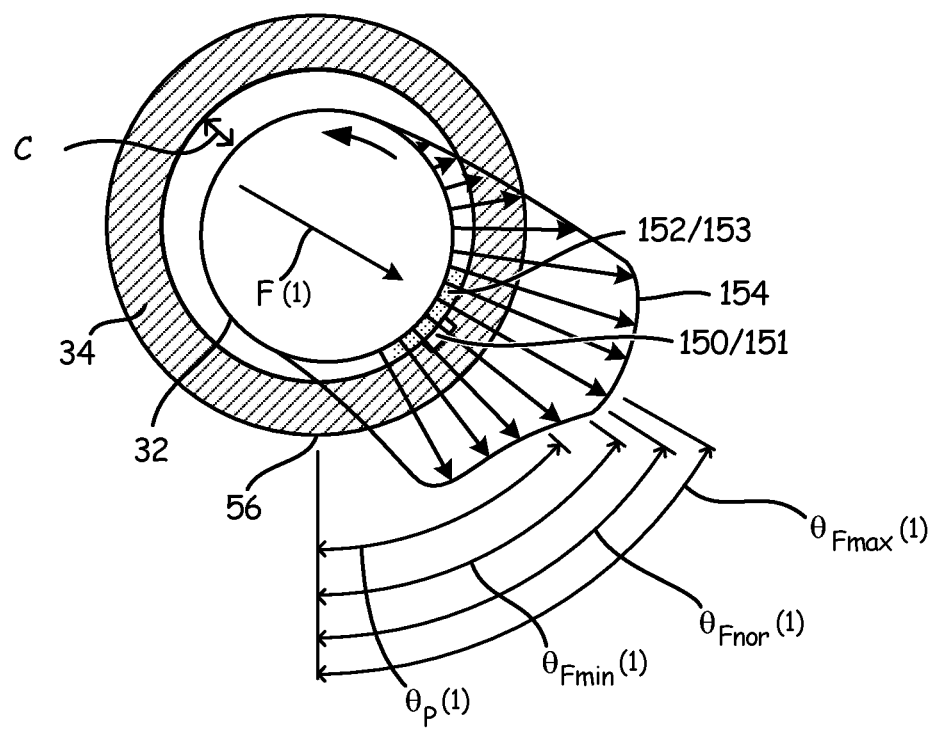
FIG. 5 is schematic diagram showing a pressure distribution profile of the drive-side stationary journal bearing which includes a first hybrid pad.

FIG. 5 is a schematic diagram showing a first bearing pressure distribution profile 154 when first hybrid pad 150 is properly configured. FIG. 5 also shows maximum diametral clearance C(1) between a surface of drive-side stationary bearing 34 and a surface of first gear shaft 32, hybrid pad center angular location $\theta_P(1)$, maximum radial load F(1), load F(1) maximum angular location $\theta_{Fmax}(1)$, load F(1) minimum angular location $\theta_{Fmin}(1)$, and load F(1) normalized angular location $\theta_{Fnor}(1)$. Angular locations are measured from first bearing flat 156 Thus the angular location with respect to drive-side stationary bearing 34 is clockwise from first bearing flat 156 viewed from gear face 30A, or counter-clockwise when viewed toward face 30A as in FIG. 4B.

Load F(1) represents a summation of loads acting on drive gear 18 (e.g., loads 22 and 24 shown in FIG. 1). Maximum radial load F(1) can range in location from load F(1) maximum angular location $\theta_{Fmax}(1)$ to load F(1) minimum angular location $\theta_{Fmin}(1)$. Angular location $\theta_{Fnor}(1)$ is a normalized location for the range of angles at which load F(1) can act.

For the illustrated first pressure distribution profile 154 of bearing 34, first gear shaft 32 rotates at a speed of approximately 8215 RPM, while maximum diametral clearance C(1) between an inner surface of drive-side stationary bearing 34 and an outer surface of first gear shaft 32 (at one longitudinal end) is approximately 0.0039 inch (0.00991 cm). In the illustrated embodiment, load F(1) can be applied at angular locations ranging from $\theta_{Fmin}(1)$ of approximately 43.4° to $\theta_{Fmax}(1)$ of approximately 52.1°, with load F(1) having normalized angular location $\theta_{Fnor}(1)$ of 47.4°. Maximum load F(1) is approximately 532 $lb_f/in^2$ (3668 kPa) in magnitude and represents the highest magnitude loading to be experienced by drive-side stationary bearing 34 in the illustrative gear pump application.

By properly configuring first hybrid pad 150 and injecting correct amounts of high-pressure fluid 11h to supplement first fluid film 152 via first hybrid pad 150, maximum load F(1) can be carried by bearing 34 through first fluid film 152 without risk of failure (i.e., touchdown of bearing 34). The proper configuration of first hybrid pad 150 is a function of a plurality of factors, which can include, for example, a rotational speed of first gear shaft 32, a magnitude and angle of radial load F(1), a maximum diametral clearance C(1) between an inner surface of bearing 34 and an outer surface of first gear shaft 32, a geometry of first gear shaft 32 relative to bearing 34, as well as properties (e.g., density, viscosity, specific heat) of fluid film 152. An improperly configured first hybrid pad 150 can vent pressure of first fluid film 152, instead of adding to its pressure, resulting in a decrease in load carrying capability of bearing 34. Also, an improperly configured first hybrid pad 150 can result in excessive leakage of gear pump 10, preventing it from meeting flow requirements.

Figure 6:
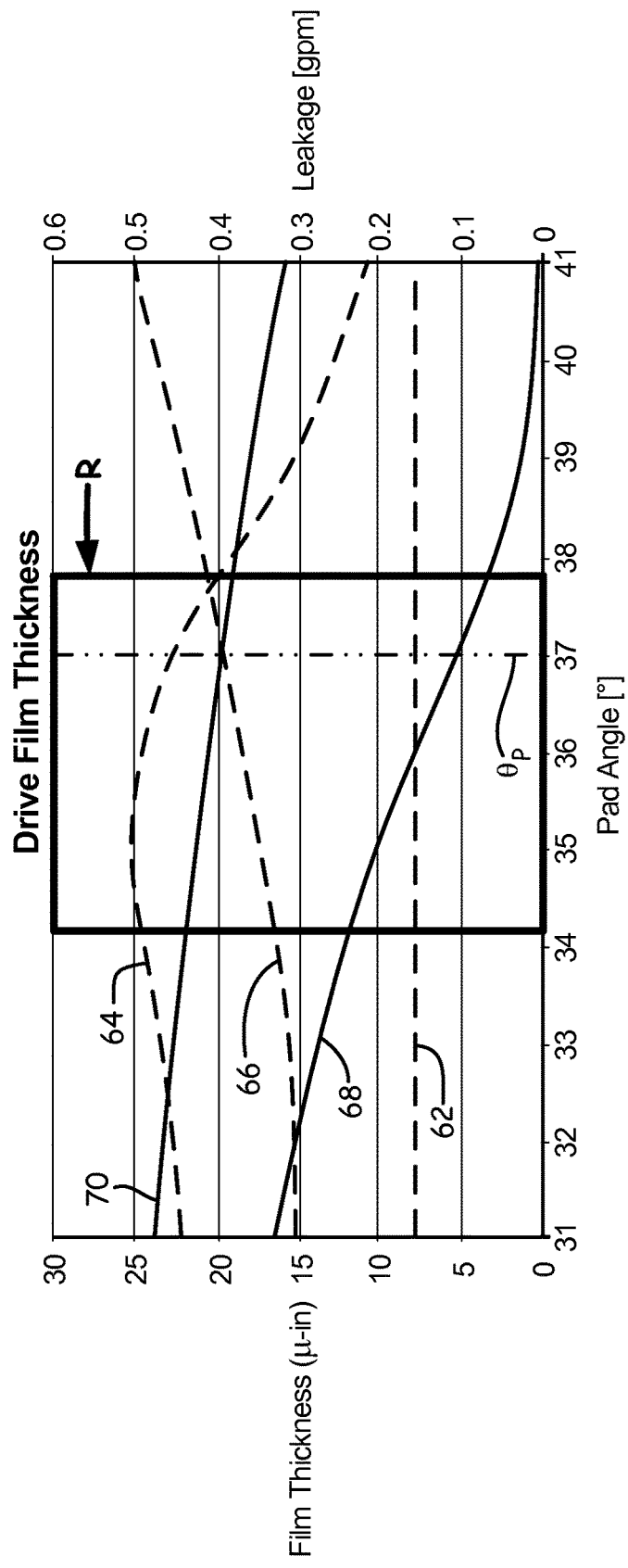
FIG. 6 is graph illustrating fluid film performance in the drive-side stationary journal bearing as a function of a first hybrid pad configuration.

FIG. 6 graphically illustrates both performance of first fluid film 152, and leakage of gear pump 10, as a function of the configuration of first hybrid pad 150. FIG. 6 data reflects maximum load F(1) (shown in FIG. 5) of approximately 532 $lb_f/in^2$ (3668 kPa) (i.e., the maximum, most challenging loading scenario for drive-side stationary journal bearing 34 under the given gear pump 10 application). Load F(1) minimum angular location $\theta_{Fmin}(1)$ is approximately 43.4°, and load F(1) maximum angular location $\theta_{Fmax}(1)$ is approximately 52.1°. A horizontal axis indicates angular location of first hybrid pad 150, as measured to a center of first hybrid pad 150 from first bearing flat 156 (in a direction of rotation, i.e. toward inlet 14 and away from outlet 16). Included on the horizontal axis is chosen hybrid pad center angular location $\theta_P(1)$ (hybrid pad 150 is centered at an angular location of 36°), as well as region R(1) which represents a range of first hybrid pad 150 center angular location $\theta_P(1)$ based on manufacturing tolerances (with all of first hybrid pad 150 axially within an angular location range of 31.0°-43.0°, as discussed previously). Region R(1) encompasses first hybrid pad 150 center angular locations $\theta_P(1)$ of approximately 34.3° to approximately 37.6°. A left vertical axis indicates a thickness of first fluid film 152 versus first hybrid pad 150 angular location, given by dashed plot lines. Thickness of first fluid film 152 is indicated by dashed lines and which include baseline plot 162 where no hybrid pad is used on bearing 34, plot 164 where first hybrid pad 150 is used and load F(1) is at a minimum load angular location $\theta_{Fmin}(1)$, and plot 166 where first hybrid pad 150 is used and load F(1) is at a maximum load angular location $\theta_{Fmax}(1)$.

Plot 162 (no hybrid pad) shows a thickness of first fluid film 152 is approximately 7.4 microinches (0.188 µm) at all angular positions of load F(1). When first hybrid pad 150 is configured on bearing 34 at angular location $\theta_P$ (37°), both plot 164 (minimum load angle) and plot 166 (maximum load angle) show a thickness of first fluid film 152 at $\theta_P(1)$ of approximately 22.5 microinches (0.571 µm). Therefore, by pressurizing and supplementing first fluid film 152 with high pressure fluid 11h at hybrid pad 150 configured at angular location $\theta_P(1)$ of about 37°, bearing 34 has a thicker first fluid film 152 and thus can carry a greater load as compared to bearing 34 without first hybrid pad 150 (plot 162). It can also maintain first fluid film 152 at a thickness great enough to support maximum load F(1) over a range of angles of load F(1). Further, designing gear pump 10 such that hybrid pad 150 is located at or about angular location $\theta_P(1)$ of about 37° allows for manufacturing tolerances within region R(1) which permit bearing 34 to perform over a range of angles of maximum load F(1) because $\theta_P(1)$ is near a maximum thickness of first fluid film 152, yet reduces a risk of manufacturing tolerances leading to a location of first hybrid pad 150 where thickness of first fluid film 152 significantly decreases.

A right vertical axis of FIG. 6 indicates leakage of gear pump 10 at the various first hybrid pad 150 angular locations on the horizontal axis, given by solid plot lines. Leakage of gear pump 10 represents a loss of flow capacity of gear pump 10 due to some of fluid 11h from discharge 16 being diverted from one or more destinations and instead delivered to first hybrid pad 150. Thus, when no hybrid pad is used, additional leakage of gear pump 10 is effectively zero. Leakage of gear pump 10 (solid plot lines) include plot 168 where first hybrid pad 150 is used and load F is at a minimum load angular location $\theta_{Fmin}(1)$, and plot 170 where first hybrid pad 150 is used and load F is at a maximum load angular location $\theta_{Fmax}(1)$. As can be seen, first hybrid pad 150 configuration also significantly affects leakage of gear pump 10. When first hybrid pad 150 is configured at angular location $\theta_P(1)$ (37°), plot 168 (minimum load angle) shows gear pump 10 leakage is approximately 0.12 gpm (0.45 l/min) at $\theta_P(1)$, while plot 170 (maximum load angle) shows gear pump 10 leakage is approximately 0.39 gpm (1.48 l/min) at $\theta_P(1)$. Therefore, by configuring first hybrid pad 150 at or about angular location $\theta_P(1)$ of 37°, gear pump 10 leakage is kept within a manageable range over the range of load angles, which can allow gear pump 10 to meet flow requirements under the various loads without compromising thickness of first fluid film 152 and in turn, the load carrying capacity of bearing 34 over the angular range of load F(1). Although altering configuration of first hybrid pad 150 forward by a few angular degrees can decrease gear pump 10 leakage, this configuration can also excessively vent fluid film 152 pressure for plot 164, decreasing thickness of first fluid film 152, and reduce load carrying capacity for at least some angular ranges of load F(1). On the other hand, altering first hybrid pad 150 configuration backward by a few angular degrees can result in excessive leakage of gear pump 10 and prevent gear pump 10 from meeting flow requirements to desired destinations.

Consequently, by properly configuring first hybrid pad 150 and delivering high pressure fluid 11*h* to first fluid film 152 at a location for first hybrid pad 150, the load carrying capacity of bearing 34 can be increased, without obstructing gear pump 10 from meeting flow requirements, such that a risk of a bearing touchdown is eliminated or substantially eliminated. Yet, bearing 34 size and/or weight is not increased, and as a result gear pump 10 can be utilized in applications with operating and/or weight requirements.

In addition to drive-side stationary journal bearing 34, one or more of the other journal bearings supporting portions of gear pump 10 can also be provided with a corresponding hybrid pad location and porting path for corresponding hybrid pads which supplement a fluid film with additional lubrication pressure and flow. These journal bearings with hybrid pad locations and/or porting paths can include drive-side pressure loaded journal bearing 35, driven-side stationary journal bearing 36, and driven-side pressure-loaded journal bearing 37 (each shown in FIGS. 3A and 3B). Unless otherwise specified, the structure of a particular element is similar or identical to that which is described relative to drive-side stationary journal bearing 34. Each example will be described in turn.

Drive-side Pressure Loaded Journal Bearing 35

Figure 7A:
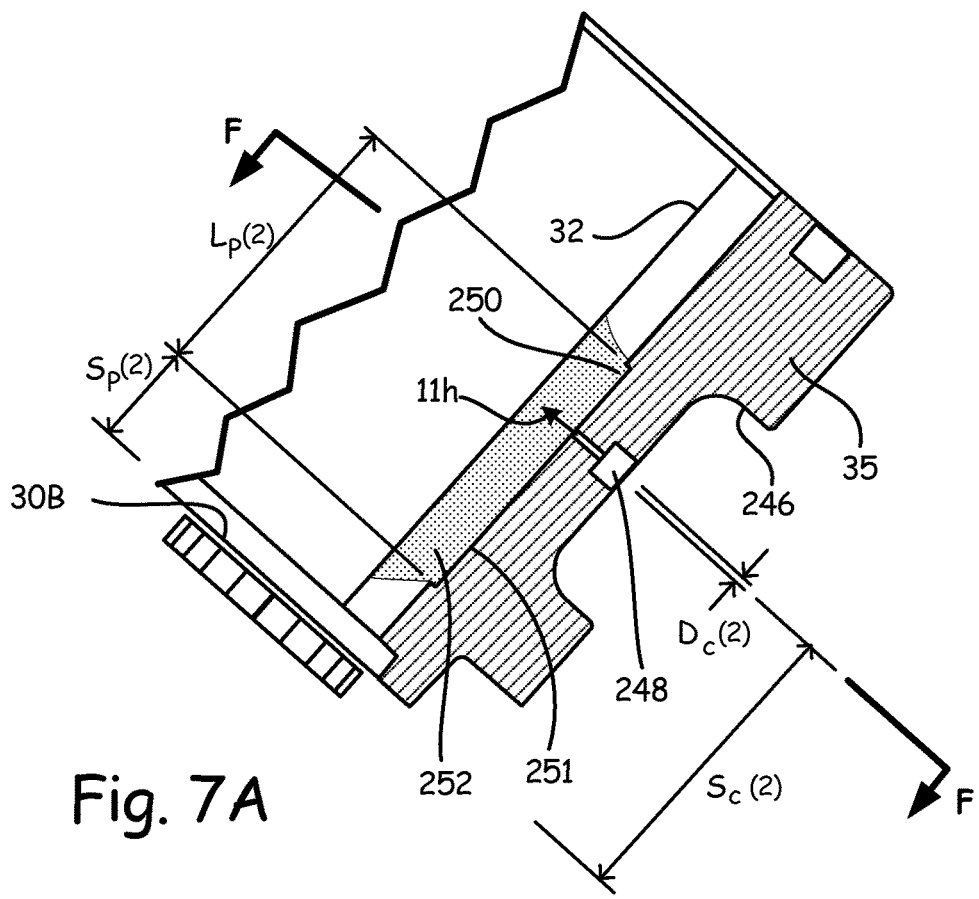
FIG. 7A is a cross-sectional view of a drive-side pressure loaded journal bearing taken along line B-B of FIG. 2.
Figure 7B:
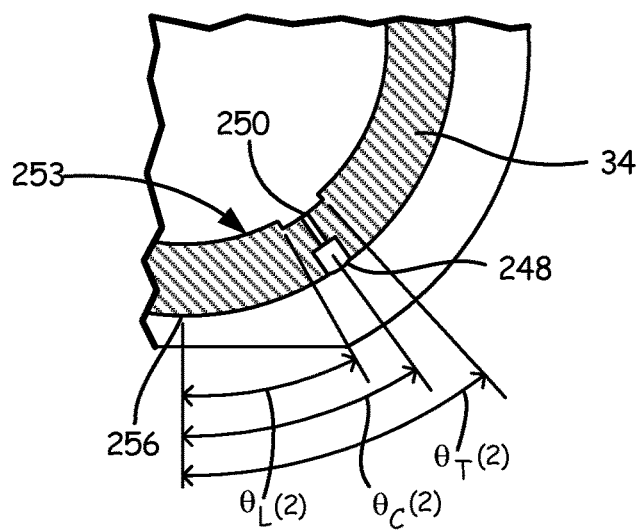
FIG. 7B is another cross-sectional view of the drive-side pressure loaded journal bearing taken along line F-F of FIG. 7A.

FIGS. 7A and 7B are cross-sectional views of drive-side pressure loaded journal bearing 35. In the example shown, drive-side pressure loaded journal bearing 35 is a second one of the plurality of journal bearings which can be used for supporting portions of gear pump 10. Similar to the first example, the sectional view in FIG. 7A is taken along line B-B of FIG. 2, while the view in FIG. 7B is taken along line F-F of FIG. 7A.

Second porting path 240 can be made up of second discharge face cut 242 (shown in FIG. 3A) on drive-side pressure loaded journal bearing 35, second axial hole 244 (also shown in FIG. 3A) through bearing 35, second radial spool cut 246 on bearing 35, and second capillary port 248. Second capillary port 248 can have diameter $D_C(2)$, as well as axial spacing $S_C(2)$ (measured from gear face 30B) and capillary port angular location $\theta_C(2)$ (measured from second bearing flat 256 shown in FIG. 2). As also shown below, second hybrid pad 250 and its corresponding second hybrid pad recess location 251 can have axial length $L_P(2)$ and axial spacing $S_P(2)$ (spacing measured from gear face 30B), while an angular location for second hybrid pad 250 and/or second hybrid pad recess location 251 can be defined at least in part via leading edge angular location $\theta_L(2)$, and trailing edge angular location $\theta_T(2)$.

Like bearing 34, the load carrying capacity of the second one of the plurality of journal bearings, drive-side pressure loaded journal bearing 35, can additionally or alternatively be increased by delivering high pressure fluid 11*h* from outlet 16 to form second hybrid pad 250 at the corresponding second hybrid pad recess location 251. A portion of the high-pressure fluid 11*h* exiting from outlet 16 can additionally or alternatively be supplied through second porting path 240. Specifically, high-pressure fluid 11*h* can be discharged from outlet 16 at second discharge face cut 242, passing through second axial hole 244 (both shown in FIG. 3A) to second radial spool cut 246. Once at second radial spool cut 246, fluid 11*h* then can travel circumferentially around second radial spool cut 246 and into second capillary port 248, as shown in FIG. 3B.

As shown in FIGS. 3B, 7A, and 7B, second capillary port 248 can extend through drive-side pressure loaded journal bearing 35 from second radial spool cut 246. Therefore, when high-pressure fluid 11*h* enters into second capillary port 248 from second radial spool cut 246, it can be delivered to a second hybrid pad recess location 251 to form second hybrid pad 250. As in the first example (shown in FIGS. 4A and 4B), high pressure fluid 11*h* can additionally or alternatively be injected to supplement second fluid film 252 at second fluid film location 253. In the illustrated embodiment of drive-side pressure loaded bearing 35, second capillary port 248 has on-center axial spacing $S_C(2)$ of approximately 0.537 inch (1.364 cm) from second drive gear face 30B and diameter $D_C(2)$ of approximately 0.023 inch (0.058 cm). However, manufacturing tolerances for diameter $D_C(2)$ can include up to +0.004 inch (0.010 cm). Second capillary port 248 can be in fluid communication anywhere along the recess location 251 for second hybrid pad 250. For example, second capillary port 248 can be configured so as to be centered on second hybrid pad 250 and/or second hybrid pad recess location 251, or as shown in other illustrated embodiments, second capillary port 248 can be configured to be offset from a center of second hybrid pad 250 and/or second hybrid pad recess location 251. As shown in this example, second capillary port 248 is offset from a center of second hybrid pad 250 and second hybrid pad recess location 251 because second capillary port 248 can be located at or near where it is most cost-effective to machine, given a geometry of bearing 35.

In the illustrated embodiment, second hybrid pad 250 (and corresponding second recess location 251) has axial length $L_P(2)$ generally mirroring axial length $L_P(1)$ of first hybrid pad 150, approximately 0.675 inch (1.71 cm). It also has second axial spacing $S_P(2)$ similar to first axial spacing $S_P(1)$, approximately 0.30 inch (0.76 cm), from second drive gear face 30B as measured from an edge of second hybrid pad 250 closest to face 30B. Manufacturing tolerances for second axial length $L_P(2)$ and second axial spacing $S_P(2)$ can similarly include ±0.01 inch (0.025 cm).

Second hybrid pad 250 (and corresponding second recess location 251) can be again in a similar or mirror-image location (relative to gear faces 30A, 30B shown in FIG. 2)

as the location of first hybrid pad 150 and corresponding first recess location 151 (shown in FIGS. 4A-4B, and 5). The location can therefore be such that second hybrid pad 250 and second recess location 251 can have a minimum leading edge angular location ($\theta_{Lmin}(2)$) of 31.0°, and a maximum trailing edge angular location ($\theta_{Tmax}(2)$) of 43.0° (i.e., all of second hybrid pad 250 and/or second recess location 251 can be within an angular location range of 31.0°-43.0°, but need not extend fully within this range). In one embodiment (shown in FIG. 7B), second hybrid pad 250 and second recess location 251 extend fully within the angular location range of 31.0°-43.0°, such that $\theta_{Lmin}(2)$ is equal to $\theta_L(2)$ and $\theta_{Tmax}(2)$ is equal to $\theta_T(2)$. In other embodiments, second hybrid pad 250 and second recess location 251 can have a leading edge angular location $\theta_L(2)$ of 32°, and a trailing edge angular location $\theta_T(2)$ of 42°. In yet further embodiments, second hybrid pad 250 and second recess location 251 can have a leading edge angular location $\theta_L(2)$ of 36°, and a trailing edge angular location $\theta_T(2)$ of 40°. As shown, second hybrid pad 250 and second recess location 251 are centered at angular location $\theta_P(2)$ of 37° (shown in FIG. 8). More generally, to provide suitable fluid film augmentation with acceptable leakage in gear pump applications, other embodiments can have an overall second hybrid pad 250 width of about 8°-12°, and/or second hybrid pad 250 and second recess location 251 can be centered at locations other than 37° as long as all of second hybrid pad 250 and/or second recess location 251 are axially located within the angular location range of 31.0°-43.0°. With second hybrid pad 250 and second recess location 251 in an angular location range of 31.0°-43.0°, second capillary port 248 has angular location $\theta_C(2)$ on bearing 35 of approximately 37.0°, as measured from a centerline of second bearing flat 256.

In use, second fluid film 252, as shown in FIG. 7A, can be disposed at second fluid film location 253 between an inner surface of drive-side pressure loaded journal bearing 35 and an outer surface of first/drive gear shaft 32. Here, fluid 11 also creates second fluid film 252, because as gear pump 10 begins to operate, a portion of fluid 11 from within housing 12 is axially drawn to second fluid film location 253 shown in FIG. 7A. By injecting high pressure fluid 11h into second hybrid pad 250, adjacent to fluid film location 253, second fluid film 252 is supplemented, and the resulting pressure of second fluid film 252 is increased compared to a pressure of fluid film 252 drawn from housing 12 alone. Therefore, the load carrying capacity of drive-side pressure loaded journal bearing 35 is increased compared to conventional gear pump bearings. In the illustrated embodiment, pressurizing or supplementing fluid film 252 with high pressure fluid 11h increases a thickness of fluid film 252 by approximately 0.000012 inch (0.000030 cm); as such, bearing 35 can carry greater loads without risk of bearing touchdown.

Figure 8:
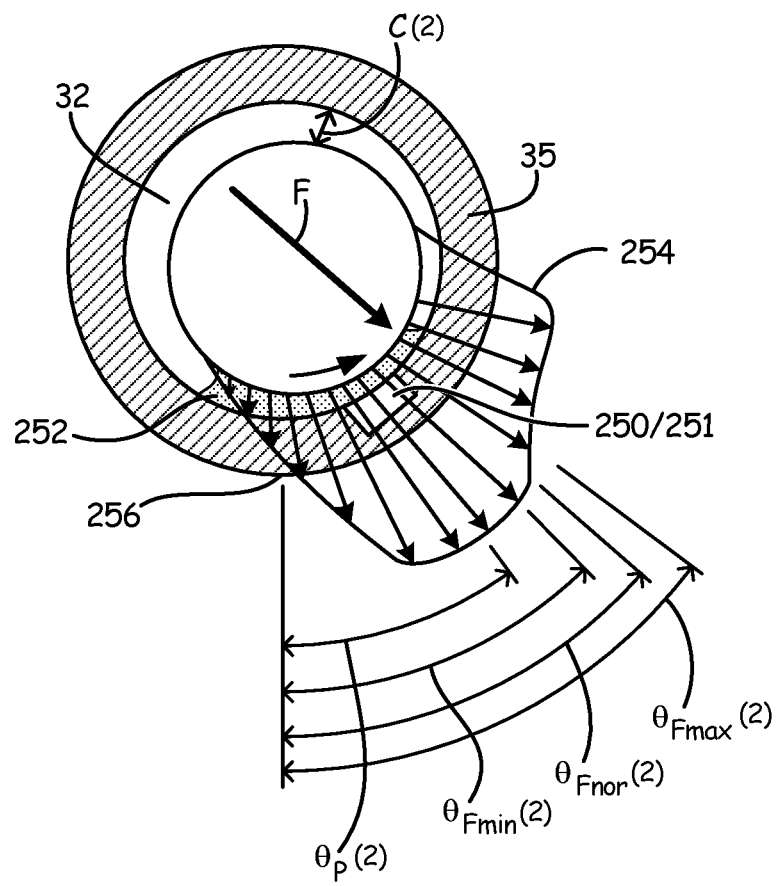
FIG. 8 is schematic diagram showing a pressure distribution profile of the drive-side pressure loaded journal bearing which includes a second hybrid pad.

FIG. 8 shows a second bearing pressure distribution profile 254 when second hybrid pad 250 is properly configured. Angular locations are measured from second bearing flat 256. Thus the angular locations with respect to drive-side pressure loaded bearing 35 are clockwise from second bearing flat 256 when viewed from gear face 30B toward adjacent bearing 35, and are counter-clockwise when viewed toward gear face 30B.

Load F(2), which represents a summation of loads acting on drive gear 18 can have a maximum value ranging in location from maximum angular location $\theta_{Fmax}(2)$ to minimum angular location $\theta_{Fmin}(2)$. Angular location $\theta_{Fnor}(2)$ is a normalized location for the range of angles at which load F(2) can act. For the illustrated second pressure distribution profile 254 of bearing 35, first/drive gear shaft 32 rotates at a speed of approximately 8215 RPM. Maximum diametral clearance C(2) between an inner surface of drive-side pressure loaded bearing 35 and an outer surface of first/drive gear shaft 32 (e.g., at a longitudinal end opposite that of the longitudinal end disposed in drive-side stationary bearing 34) is approximately 0.0039 inch (0.00991 cm). In the illustrated embodiment, load F(2) can be applied at angular locations ranging from $\theta_{Fmin}(2)$ of approximately 43.4° to $\theta_{Fmax}(2)$ of approximately 52.1°, with load F(2) having normalized angular location $\theta_{Fnor}(2)$ of 47.4°. Maximum load F(2) is similarly about 532 lb/in$^2$ (3668 kPa) in magnitude and represents the highest magnitude loading to be experienced by drive-side pressure loaded bearing 35 in the illustrative gear pump application.

By properly configuring second hybrid pad 250 and injecting correct amounts of high-pressure fluid 11h to supplement second fluid film 252 (via second hybrid pad 250), maximum load F(2) can be carried by bearing 35 through second fluid film 252 without risk of failure (i.e., touchdown of bearing 35). Like the previous example, a proper configuration of second hybrid pad 250 can be a function of several factors, including, for example, a rotational speed of first gear shaft 32, a magnitude and angle of radial load F(2), maximum diametral clearance C(2) between an inner surface of bearing 35 and an outer surface of first gear shaft 32, a geometry of first gear shaft 32 relative to bearing 35, as well as properties (e.g., density, viscosity, specific heat) of second fluid film 252. An improperly configured second hybrid pad 250 can vent pressure of second fluid film 252, resulting in decreased load carrying capability of bearing 35. Also, an improperly configured second hybrid pad 250 can result in excessive leakage of gear pump 10, preventing it from meeting flow requirements.

With respect to performance of second fluid film 252 and leakage of gear pump 10, as a function of the configuration of second hybrid pad 250, this can be seen by referring back to the graph and description of FIG. 6, in which maximum load F(1) also reflects maximum load F(2) (shown in FIG. 8) of approximately 532 lb/in$^2$ (3668 kPa) (i.e., the maximum, most challenging loading scenario for drive-side pressure loaded journal bearing 35 under the given gear pump 10 application).

Driven-side Stationary Journal Bearing 36

Figure 9A:
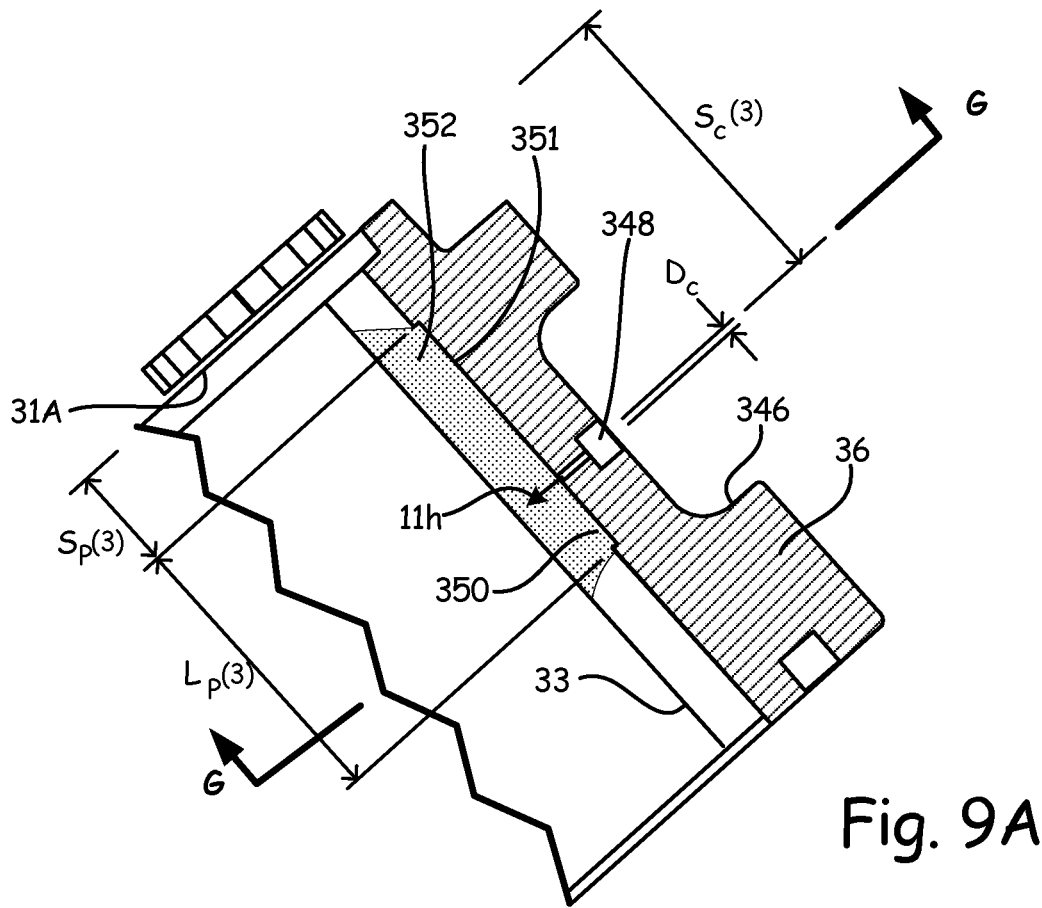
FIG. 9A is a cross-sectional view of a driven-side stationary journal bearing taken along line C-C of FIG. 2.
Figure 9B:
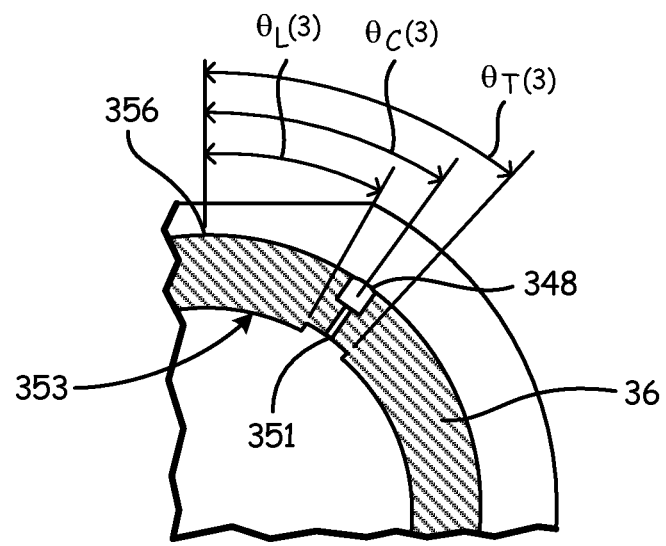
FIG. 9B is another cross-sectional view of the driven-side stationary journal bearing taken along line G-G of FIG. 9A.

FIGS. 9A and 9B are cross-sectional views of driven-side stationary journal bearing 36. In the example shown, driven-side stationary journal bearing 36 is a third one of the plurality of journal bearings which can be used for supporting portions of gear pump 10. Similar to the first example, the sectional view in FIG. 9A is taken along line C-C of FIG. 2, while the view in FIG. 9B is taken along line G-G of FIG. 9A.

Third porting path 340 can be made up of third discharge face cut 342 (shown in FIG. 3A) on driven-side stationary journal bearing 36, third axial hole 344 (also shown in FIG. 3A) through bearing 36, third radial spool cut 346 on bearing 36, and third capillary port 348. Third capillary port 348 can have diameter $D_C(3)$, as well as axial spacing $S_C(3)$ (measured from gear face 31A) and capillary port angular location $\theta_C(3)$ (measured from third bearing flat 356 shown in FIG. 2). As also shown below, third hybrid pad 350 and its corresponding third hybrid pad recess location 351 can have axial length $L_P(3)$ and axial spacing $S_P(3)$ (spacing measured from gear face 31A), while an angular location for third hybrid pad 350 and/or third hybrid pad recess location 351 can be defined at least in part via leading edge angular location $\theta_L(3)$, and trailing edge angular location $\theta_T(3)$).

Like bearings 34 and 35, the load carrying capacity of the third one of the plurality of journal bearings, driven-side stationary journal bearing 36, can additionally or alternatively be increased by delivering high pressure fluid 11h from outlet 16 to form third hybrid pad 350 at the corresponding third hybrid pad recess location 351. A portion of the high-pressure fluid 11h exiting from outlet 16 can additionally or alternatively be supplied through third porting path 340. Specifically, high-pressure fluid 11h can be discharged from outlet 16 at third discharge face cut 342, passing through third axial hole 344 (both shown in FIG. 3A) to third radial spool cut 346. At third radial spool cut 346, fluid 11h then can travel circumferentially around third radial spool cut 346 and into third capillary port 348, as shown in FIG. 3B.

As shown in FIGS. 3B, 9A, and 9B, third capillary port 348 can extend through drive-side stationary journal bearing 36 from third radial spool cut 346. Therefore, when high-pressure fluid 11h enters into third capillary port 348 from third radial spool cut 346, it can be delivered to a third hybrid pad recess location 351 to form third hybrid pad 350. As in the first and second examples (shown in FIGS. 4A-4B and 7A-7B), high pressure fluid 11h can additionally or alternatively be injected to supplement third fluid film 352 at third fluid film location 353. In the illustrated embodiment of driven-side stationary bearing 36, third capillary port 348 has on-center axial spacing $S_C(3)$ of approximately 0.600 inch (1.524 cm) from third drive gear face 31A and diameter $D_C(3)$ of approximately 0.023 inch (0.058 cm). However, manufacturing tolerances for diameter $D_C(3)$ can include up to +0.004 inch (0.010 cm). Third capillary port 348 can be in fluid communication anywhere along the recess location 351 for third hybrid pad 350. For example, third capillary port 348 can be configured so as to be centered on third hybrid pad 350 and/or third hybrid pad recess location 351, or as shown in other illustrated embodiments, third capillary port 348 can be configured to be offset from a center of third hybrid pad 350 and/or third hybrid pad recess location 351. As shown in this example, third capillary port 348 is offset from a center of third hybrid pad 350 and third hybrid pad recess location 351 because third capillary port 348 can be located at or near where it is most cost-effective to machine, given a geometry of bearing 36.

In the illustrated embodiment, third hybrid pad 350 (and corresponding third recess location 351) has axial length $L_P(3)$ of approximately 0.675 inch (1.71 cm). It also has third axial spacing $S_P(3)$ of approximately 0.30 inch (0.76 cm) from third drive gear face 31A as measured from an edge of third hybrid pad 350 closest to face 31A, while manufacturing tolerances for third axial length $L_P(3)$ and third axial spacing $S_P(3)$ can include ±0.01 inch (0.025 cm). Third hybrid pad 350 has a corresponding recess location 351 such that third hybrid pad 350 has a minimum leading edge angular location ($\theta_{Lmin}(3)$) of 40.0°, and a maximum trailing edge angular location ($\theta_{Tmax}(3)$) of 52.0° (i.e., all of third hybrid pad 350 is within an angular location range of 40.0°-52.0°, but need not extend fully within this range). In one embodiment (shown in FIG. 9B), third hybrid pad 350 extends fully within the angular location range of 40.0°-52.0°, such that $\theta_{Lmin}(3)$ is equal to $\theta_L(3)$ and $\theta_{Tmax}(3)$ is equal to $\theta_T(3)$. In other embodiments, third hybrid pad 350 can have a leading edge angular location $\theta_L(3)$ of 41°, and a trailing edge angular location $\theta_T(3)$ of 51°. In yet further embodiments, third hybrid pad 350 can have a leading edge angular location $\theta_L(3)$ of 44°, and a trailing edge angular location $\theta_T(3)$ of 48°. As shown, third hybrid pad 350 is centered at angular location $\theta_P(3)$ of 46° (shown in FIG. 10). More generally, to provide suitable fluid film augmentation with acceptable leakage in gear pump applications, other embodiments can have an overall third hybrid pad 350 width of about 8°-12°, and/or third hybrid pad 350 can be centered at locations other than 46° as long as all of third hybrid pad 350 is axially located within the angular location range of 40.0°-52.0°. With third hybrid pad 350 and/or third hybrid pad recess location 351 in an angular location range of 40.0°-52.0°, an angular location $\theta_C(3)$ of third capillary port 348 on bearing 36 can be about 46.0°, measured from a centerline of third bearing flat 356.

In use, third fluid film 352, as shown in FIG. 9A, can be disposed at third fluid film location 353 between an inner surface of driven-side stationary journal bearing 36 and an outer surface of second/driven gear shaft 33. Here, fluid 11 also creates third fluid film 352, since a portion of fluid 11 from within housing 12 is axially drawn to third fluid film location 353 as gear pump 10 begins to operate. By injecting high pressure fluid 11h into third hybrid pad 350, adjacent to third fluid film location 353, third fluid film 352 is supplemented, and the resulting pressure of third fluid film 352 is increased compared to a pressure of fluid film 352 drawn from housing 12 alone. Therefore, the load carrying capacity of driven-side stationary journal bearing 36 is increased compared to conventional gear pump bearings. In the illustrated embodiment, pressurizing or supplementing fluid film 352 with high pressure fluid 11h increases a thickness of fluid film 352 by approximately 0.0000092 inch (0.0000234 cm), and as a result, bearing 36 can carry greater loads without risk of a bearing touchdown.

Figure 10:
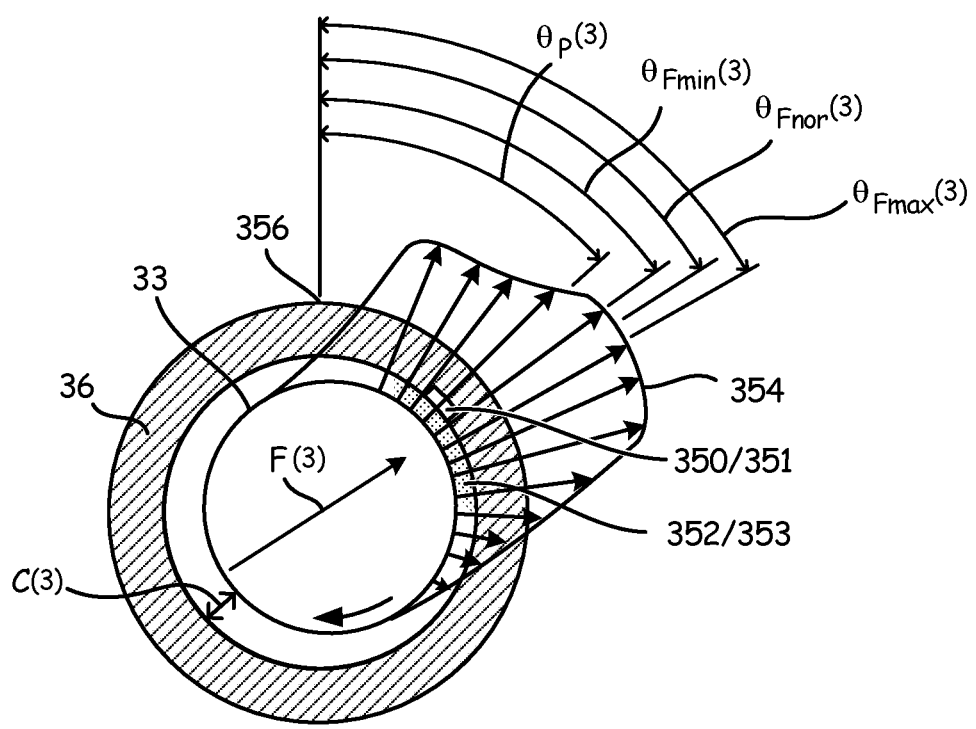
FIG. 10 is schematic diagram showing a pressure distribution profile of the driven-side stationary journal bearing which includes a third hybrid pad.

FIG. 10 shows third bearing pressure distribution profile 354 when third hybrid pad 350 is properly configured. Angular locations are measured from third bearing flat 356. Thus an angular location with respect to driven-side stationary bearing 36 is counter-clockwise from third bearing flat 356 when viewed from gear face 31A adjacent bearing 36, and clockwise when viewed toward gear face 31A as in FIG. 9B.

Load F(3), which represents a summation of loads acting on driven gear 20 can have a maximum value ranging in location from maximum angular location $\theta_{Fmax}(3)$ to minimum angular location $\theta_{Fmin}(3)$. Angular location $\theta_{Fnor}(3)$ is a normalized location for the range of angles at which load F(3) can act. For the illustrated third pressure distribution profile 354 of bearing 36, second/driven gear shaft 33 rotates at a speed of approximately 8935 RPM. Maximum diametral clearance C(3) between an inner surface of driven-side stationary bearing 36 and an outer surface of second/driven gear shaft 33 (e.g., at one longitudinal end) is approximately 0.0039 inch (0.00991 cm). In the illustrated embodiment, load F(3) can be applied at angular locations ranging from $\theta_{Fmin}(3)$ of approximately 52.4° to $\theta_{Fmax}(3)$ of approximately 64.0°, with load F(3) having normalized angular location $\theta_{Fnor}(3)$ of 58.2°. Maximum load F(3) is approximately 636 $lb_f/in^2$ (4385 kPa) in magnitude and represents the highest magnitude loading to be experienced by driven-side stationary bearing 36 in the illustrative gear pump application.

By properly configuring third hybrid pad 350 and injecting correct amounts of high-pressure fluid 11h to supplement third fluid film 352 (via third hybrid pad 350), maximum load F(3) can be carried by bearing 36 through third fluid film 352 without risk of failure (i.e., touchdown of bearing 36). Like previous examples, a proper configuration of third hybrid pad 350 can be a function of several factors, including, for example, a rotational speed of second gear shaft 33, a magnitude and location of radial load F(3), a maximum diametral clearance C(3) between an inner surface of bearing 36 and an outer surface of second gear shaft 33, a geometry of second gear shaft 33 relative to bearing 36, as well as properties (e.g., density, viscosity, specific heat) of third fluid film 352. An improperly configured third hybrid pad 350 can vent pressure of third fluid film 352, instead of adding to its pressure, resulting in a decrease in load carrying capability of bearing 36. Also, an improperly configured third hybrid pad 350 can result in excessive leakage of gear pump 10, preventing it from meeting flow requirements.

Figure 11:
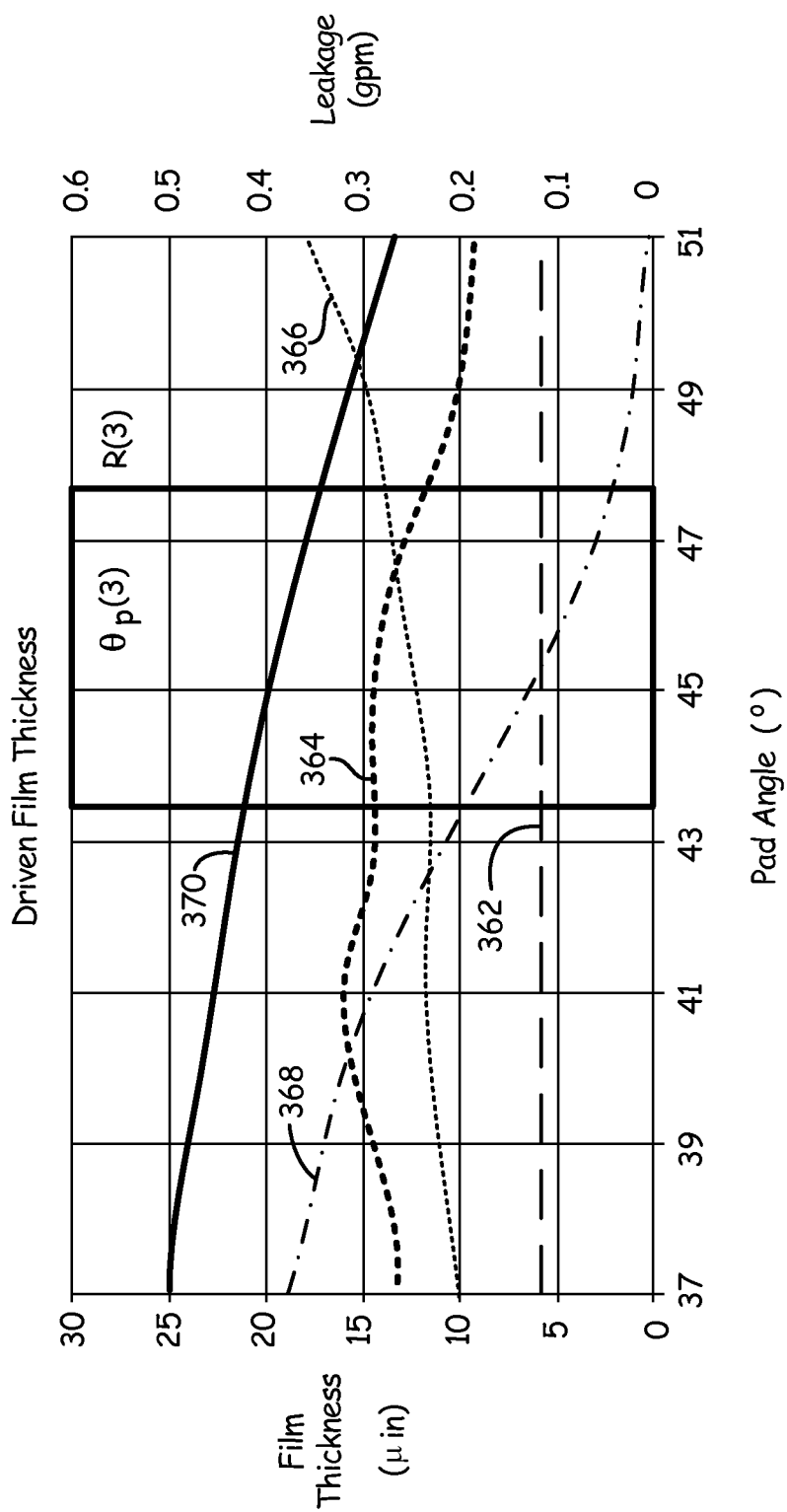
FIG. 11 is graph illustrating fluid film performance of the driven-side stationary journal bearing as a function of a third hybrid pad configuration.

FIG. 11 graphically illustrates both performance of third fluid film 352, and leakage of gear pump 10 as a function of the configuration of third hybrid pad 350. FIG. 11 data reflects maximum load F(3) (shown in FIG. 10) of approximately 636 lb$_f$/in$^2$ (4385 kPa) (i.e., the maximum, most challenging loading scenario for driven-side stationary journal bearing 36 under the given gear pump 10 application). Here, for load F(3), a minimum angular location $\theta_{Fmin}(3)$ is approximately 52.4°, and maximum angular location $\theta_{Fmax}(3)$ is approximately 64.0°. A horizontal axis indicates angular location of third hybrid pad 350, as measured to a center of third hybrid pad 350 from third bearing flat 356 (in a direction of rotation, i.e. toward inlet 14 and away from outlet 16). Included on the horizontal axis is chosen hybrid pad center angular location $\theta_P(3)$ (hybrid pad 350 is centered at an angular location of 46°), as well as region R(3) which represents a range of third hybrid pad 350 center angular location $\theta_P(3)$ based on manufacturing tolerances (with all of third hybrid pad 350 axially within an angular location range of 40.0°-52.0°, as discussed previously). Region R(3) encompasses third hybrid pad 350 center angular locations $\theta_P(3)$ of approximately 42.5° to approximately 47.5°. A left vertical axis indicates a thickness of third fluid film 352 versus angular location of third hybrid pad 350, given by dashed plot lines. Thickness of third fluid film 352 is indicated by dashed lines and which include baseline plot 362 where no hybrid pad is used on bearing 36, plot 364 where third hybrid pad 350 is used and load F(3) is at a minimum load angular location $\theta_{Fmin}(3)$, and plot 366 where third hybrid pad 350 is used and load F(3) is at a maximum load angular location $\theta_{Fmax}(3)$.

Plot 362 (no hybrid pad) shows a thickness of third fluid film 352 is approximately 5.9 microinches (0.150 µm) at all angular positions of load F(3). When third hybrid pad 350 is configured on bearing 36 at angular location $\theta_P(3)$ of about 46°, plot 364 (minimum load angle) shows a thickness of third fluid film 352 at $\theta_P(3)$ of approximately 22.5 microinches (0.571 µm) and plot 366 (maximum load angle) shows a thickness of third fluid film 352 at or near $\theta_P(3)$ of approximately 19.6±0.2 microinches (0.498 µm±0.005 µm). Therefore, by pressurizing and supplementing third fluid film 352 with high pressure fluid 11h at hybrid pad 350 configured at angular location $\theta_P(3)$ of about 46°, bearing 36 has a thicker third fluid film 352 and thus can carry a greater load as compared to bearing 36 without third hybrid pad 350 (plot 362). It can also maintain third fluid film 352 at a thickness great enough to support maximum load F(3) over a range of angles. Furthermore, designing gear pump 10 such that hybrid pad 350 is located at or about angular location $\theta_P(3)$ of about 46° allows for manufacturing tolerances within region R(3) which still permit bearing 36 to perform over a range on angles of maximum load F(3) because $\theta_P(3)$ is near a maximum thickness of third fluid film 352, yet eliminates a risk of manufacturing tolerances leading to a location of third hybrid pad 350 where the thickness of third fluid film 352 significantly decreases.

A right vertical axis of FIG. 11 indicates leakage of gear pump 10 at the various third hybrid pad 350 angular locations on the horizontal axis, given by solid plot lines. Leakage of gear pump 10 represents a loss of flow capacity of gear pump 10 due to some of fluid 11h from discharge 16 being diverted from one or more destinations and instead delivered to third hybrid pad 350. Thus, when no hybrid pad is used, additional leakage of gear pump 10 is effectively zero. Leakage of gear pump 10 (solid plot lines) include plot 368 where third hybrid pad 350 is used and load F(3) is at a minimum load angular location $\theta_{Fmin}(3)$, and plot 370 where third hybrid pad 350 is used and load F(3) is at a maximum load angular location $\theta_{Fmax}(3)$. As can be seen, third hybrid pad 350 configuration also significantly affects leakage of gear pump 10. When third hybrid pad 350 is configured at angular location $\theta_P(3)$ (46°), plot 368 (minimum load angle) shows gear pump 10 leakage is approximately 0.11 gpm (0.42 l/min) at $\theta_P(3)$, while plot 370 (maximum load angle) shows gear pump 10 leakage is approximately 0.39 gpm (1.48 l/min) at $\theta_P(3)$. Therefore, by configuring third hybrid pad 350 at or about angular location $\theta_P(3)$ of 46°, gear pump 10 leakage is kept within a manageable range over the range of load angles, which can allow gear pump 10 to meet flow requirements under the various loads without compromising thickness of third fluid film 352 and in turn, the load carrying capacity of bearing 36 over the angular range of load F(3). Although altering configuration of third hybrid pad 350 forward by a few angular degrees can decrease leakage, this configuration can also excessively vent pressure of third fluid film 352 (plot 364), decreasing thickness of third fluid film 352, and reduce load carrying capacity for load F(3) over at least some angular ranges. On the other hand, altering configuration of third hybrid pad 350 backward by a few degrees can result in excessive leakage of gear pump 10 and prevent gear pump 10 from meeting flow requirements.

Driven-side Pressure Loaded Journal Bearing 37

Figure 12A:
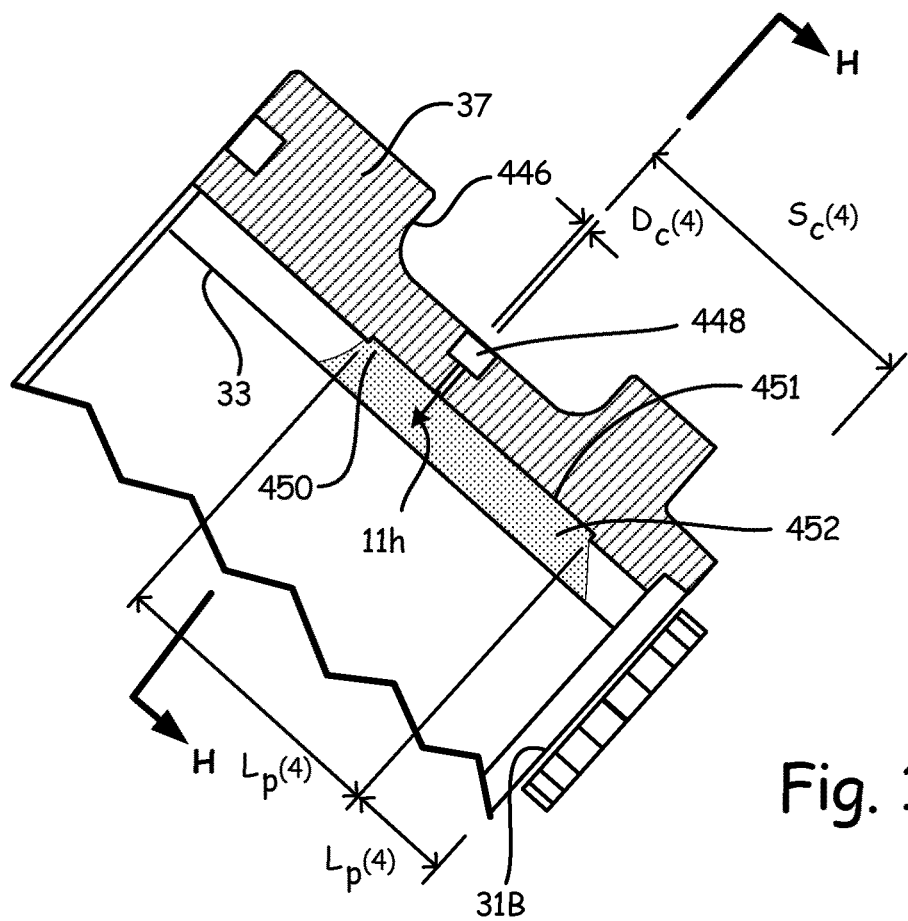
FIG. 12A is a cross-sectional view of a driven-side pressure loaded journal bearing taken along line D-D of FIG. 2.
Figure 12B:
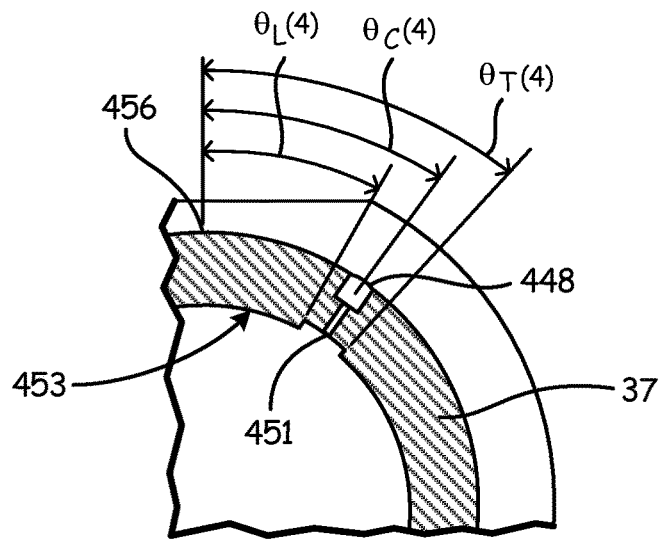
FIG. 12B is another cross-sectional view of the driven-side pressure loaded journal bearing taken along line H-H of FIG. 12A.

FIGS. 12A and 12B are cross-sectional views of driven-side pressure loaded journal bearing 37. In the example shown, driven-side pressure loaded journal bearing 37 is a fourth one of the plurality of journal bearings which can be used for supporting portions of gear pump 10. Similar to the previous examples, the sectional view in FIG. 12A is taken along line D-D of FIG. 2, while the view in FIG. 12B is taken along line H-H of FIG. 12A.

Fourth porting path 440 can be made up of fourth discharge face cut 442 (shown in FIG. 3A) on driven-side pressure loaded journal bearing 37, fourth axial hole 444 (also shown in FIG. 3A) through bearing 37, fourth radial spool cut 446 on bearing 37, and fourth capillary port 448. Fourth capillary port 448 can have diameter $D_C(4)$, as well as axial spacing $S_C(4)$ (measured from gear face 31B) and capillary port angular location $\theta_C(4)$ (measured from fourth bearing flat 456 shown in FIG. 2). As shown below, fourth hybrid pad 450 and its corresponding fourth hybrid pad recess location 451 can have axial length $L_P(4)$ and axial spacing $S_P(4)$ (spacing measured from gear face 31B), while an angular location for fourth hybrid pad 450 can be defined at least in part via leading edge angular location $\theta_L(4)$, and trailing edge angular location $\theta_T(4)$.

Like bearings 34, 35, and 36, load carrying capacity of a fourth one of a plurality of journal bearings, driven-side pressure loaded journal bearing 37, additionally or alternatively can be increased by delivering high pressure fluid 11h from outlet 16 to form fourth hybrid pad 450 at the corresponding fourth hybrid pad recess location 451. A portion of the high-pressure fluid 11h exiting from outlet 16 can additionally or alternatively be supplied through fourth porting path 440. Specifically, high-pressure fluid 11h can be discharged from outlet 16 at fourth discharge face cut 442, passing through fourth axial hole 444 (both shown in FIG. 3A) to fourth radial spool cut 446. Once at fourth radial spool cut 446, fluid 11h then can travel circumferentially around fourth radial spool cut 446 and into fourth capillary port 448, as shown in FIG. 3B.

As shown in FIGS. 3B, 12A, and 12B, fourth capillary port 448 can extend through drive-side pressure loaded journal bearing 37 from fourth radial spool cut 446. Therefore, when high-pressure fluid 11h enters into fourth capillary port 448 from fourth radial spool cut 446, it can be delivered to a fourth hybrid pad recess location 451 to form fourth hybrid pad 450. As in the other examples (shown in FIGS. 4A-4B, 7A-7B, and 9A-9B), high pressure fluid 11h can additionally or alternatively be injected to supplement fourth fluid film 452 at fourth fluid film location 453. In the illustrated embodiment of driven-side pressure loaded bearing 37, fourth capillary port 448 has on-center axial spacing $S_C(4)$ of approximately 0.537 inch (1.364 cm) from fourth drive gear face 31B and diameter $D_C(4)$ of approximately 0.023 inch (0.058 cm). However, manufacturing tolerances for diameter $D_C(4)$ can include up to +0.004 inch (0.010 cm). Fourth capillary port 448 can be in fluid communication anywhere along the recess location 451 for fourth hybrid pad 450 and/or fourth hybrid pad recess location 451. For example, fourth capillary port 448 can be configured so as to be centered on fourth hybrid pad 450 and/or fourth hybrid pad recess location 451, or as shown in other illustrated embodiments, fourth capillary port 448 can be configured to be offset from a center of fourth hybrid pad 450 and/or fourth hybrid pad recess location 451. As shown in this example, fourth capillary port 448 is offset from a center of fourth hybrid pad 450 because fourth capillary port 448 can be located at or near where it is most cost-effective to machine, given a geometry of bearing 37.

In the illustrated embodiment, fourth hybrid pad 450 (and corresponding fourth recess location 451) has axial length $L_P(4)$ generally mirroring axial length $L_P(3)$ of third hybrid pad 350, approximately 0.675 inch (1.71 cm). It also has fourth axial spacing $S_P(4)$ similar to third axial spacing $S_P(3)$, approximately 0.30 inch (0.76 cm) as measured from an edge of fourth hybrid pad 450 and/or fourth hybrid pad recess location 451 closest to face 31B. Manufacturing tolerances for fourth axial length $L_P(4)$ and fourth axial spacing $S_P(4)$ can similarly include ±0.01 inch (0.025 cm).

Fourth hybrid pad 450 (and corresponding fourth recess location 451) has a corresponding location which can be, again, in a similar or mirror-image location (relative to gear faces 31A, 31B shown in FIG. 2) as the location of third hybrid pad 350 and corresponding third recess location 351 (shown in FIGS. 9A-9B, and 10). The location can therefore be such that fourth hybrid pad 450 and fourth recess location 451 can have a minimum leading edge angular location ($\theta_{Lmin}(4)$) of 40.0°, and a maximum trailing edge angular location ($\theta_{Tmax}(4)$) of 52.0° (i.e., all of fourth hybrid pad 450 and/or fourth recess location 451 is within an angular location range of 40.0°-52.0°, but need not extend fully within this range). In one embodiment (shown in FIG. 12B), fourth hybrid pad 450 and fourth recess location 451 extend fully within the angular location range of 40.0°-52.0°, such that $\theta_{Lmin}(4)$ is equal to $\theta_L(4)$ and $\theta_{Tmax}(4)$ is equal to $\theta_T(4)$. In other embodiments, fourth hybrid pad 450 and fourth recess location 451 can have a leading edge angular location $\theta_L(4)$ of 41°, and a trailing edge angular location $\theta_T(4)$ of 51°. In yet further embodiments, fourth hybrid pad 450 and fourth recess location 451 can have a leading edge angular location $\theta_L(4)$ of 43°, and a trailing edge angular location $\theta_T(4)$ of 49°. As shown, fourth hybrid pad 450 and/or fourth recess location 451 are centered at angular location $\theta_P(4)$ of 46° (shown in FIG. 13). More generally, to provide suitable fluid film augmentation with acceptable leakage in gear pump applications, other embodiments can have an overall fourth hybrid pad 450 width of about 8°-12°, and/or fourth hybrid pad 450 and fourth recess location 451 can be centered at locations other than 46° as long as all of fourth hybrid pad 450 and/or fourth recess location 451 are is axially located within the angular location range of 40.0°-52.0°. With fourth hybrid pad 450 in an angular location range of 40.0°-52.0°, an angular location $\theta_C(4)$ of fourth capillary port 448 on bearing 37 can be about 46.0°, measured from a centerline of fourth bearing flat 456.

In use, fourth fluid film 452, as shown in FIG. 12A, can be disposed at fourth fluid film location 453 between an inner surface of driven-side stationary journal bearing 37 and an outer surface of second/driven gear shaft 33. Here, fluid 11 also creates fourth fluid film 452, since a portion of fluid 11 from within housing 12 is axially drawn to fourth fluid film location 453 as gear pump 10 begins to operate. By injecting high pressure fluid 11h into fourth hybrid pad 450, adjacent to fourth fluid film location 453, fourth fluid film 452 is supplemented, and the resulting pressure of fourth fluid film 452 is increased compared to a pressure of fluid film 452 drawn from housing 12 alone. Therefore, the load carrying capacity of driven-side stationary journal bearing 37 is increased compared to conventional gear pump bearings. In the illustrated embodiment, pressurizing or supplementing fluid film 452 with high pressure fluid 11h increases a thickness of fluid film 452 by approximately 0.000012 inch (0.000030 cm), and as a result, bearing 37 can carry greater loads without risk of a bearing touchdown.

Figure 13:
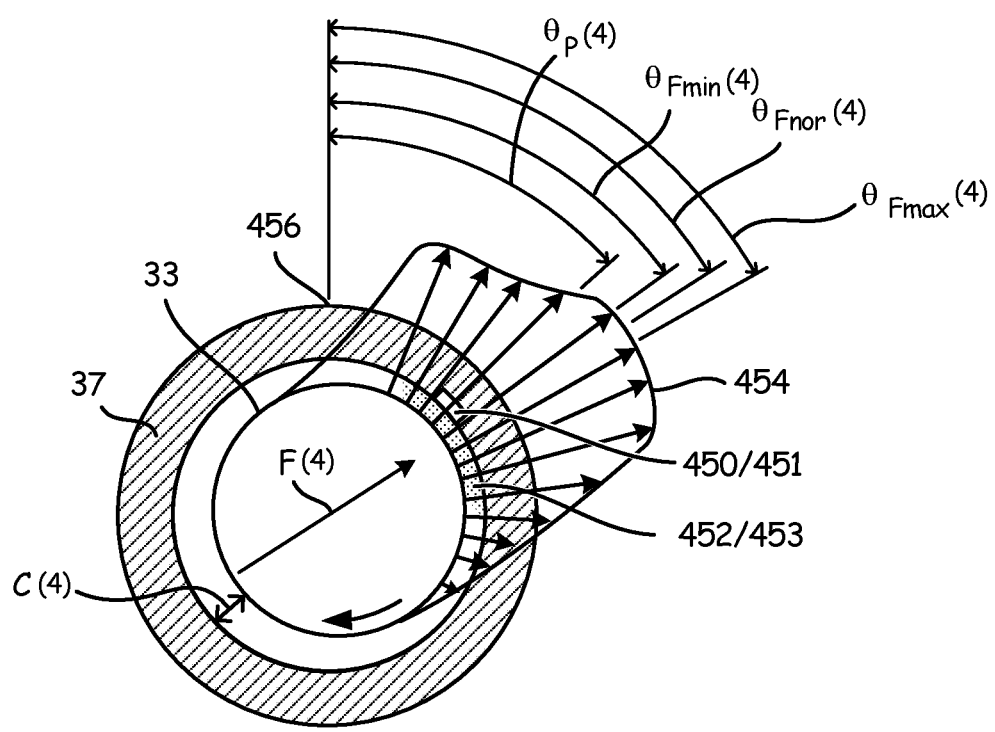
FIG. 13 is schematic diagram showing a pressure distribution profile of the driven-side pressure loaded journal bearing which includes a fourth hybrid pad.

FIG. 13 shows fourth bearing pressure distribution profile 454 when fourth hybrid pad 450 is properly configured. Angular locations are measured from fourth bearing flat 456. Thus an angular location with respect to driven-side pressure loaded bearing 37 is counter-clockwise from fourth bearing flat 456 when viewed from gear face 31B adjacent bearing 37, and clockwise when viewed toward gear face 31B as in FIG. 12B.

Load F(4), which represents a summation of loads acting on driven gear 20 can have a maximum value ranging in location from maximum angular location $\theta_{Fmax}(4)$ to minimum angular location $\theta_{Fmin}(4)$. Angular location $\theta_{Fnor}(4)$ is a normalized location for the range of angles at which load F(4) can act. For the illustrated fourth pressure distribution profile 454 of bearing 37, second/driven gear shaft 33 rotates at a speed of approximately 8215 RPM. Maximum diametral clearance C(4) between an inner surface of driven-side pressure loaded bearing 37 and an outer surface of second/driven gear shaft 33 (e.g., at one longitudinal end) is approximately 0.0039 inch (0.00991 cm). In the illustrated embodiment, load F(4) can be applied at angular locations ranging from $\theta_{Fmin}(4)$ of approximately 52.4° to $\theta_{Fmax}(4)$ of approximately 64.0°, with load F(4) having normalized angular location $\theta_{Fnor}(4)$ of 58.2°. Maximum load F(4) is approximately 636 lb$_f$/in$^2$ (4385 kPa) in magnitude and represents the highest magnitude loading to be experienced by driven-side pressure loaded bearing 37 in the illustrative gear pump application.

By properly configuring fourth hybrid pad 450 and injecting correct amounts of high-pressure fluid 11h to supplement fourth fluid film 452 (via fourth hybrid pad 450), maximum load F(4) can be carried by bearing 37 through fourth fluid film 452 without risk of failure (i.e., touchdown of bearing 37). Like the previous examples, a proper configuration of fourth hybrid pad 450 can be a function of several factors, including, for example, a rotational speed of second gear shaft 33, a magnitude and angle of radial load F(4), maximum diametral clearance C(4) between an inner surface of bearing 37 and an outer surface of second gear shaft 33, a geometry of second gear shaft 33 relative to bearing 37, as well as properties (e.g., density, viscosity, specific heat) of fourth fluid film 452. An improperly configured fourth hybrid pad 450 can vent pressure of fourth fluid film 452, instead of adding pressure, resulting in a decrease in load carrying capability of bearing 37. Also, an improperly configured fourth hybrid pad 450 can result in excessive leakage of gear pump 10, preventing it from meeting flow requirements.

With respect to performance of fourth fluid film 452 and leakage of gear pump 10, as a function of the configuration of fourth hybrid pad 450, this can be seen by referring back to the graph and description of FIG. 11, in which maximum load F(3) also reflects maximum load F(4) (shown in FIG. 13) of approximately 636 lb$_f$/in$^2$ (4385 kPa) (i.e., the maximum, most challenging loading scenario for driven-side pressure loaded journal bearing 37 under the given gear pump 10 application).

The present inventors have discovered that at hybrid pad locations significantly less than the selected approximate angular location $\theta_P$, thickness of the corresponding fluid film decreases, and thus so does load carrying capacity (and the ability to accommodate manufacturing tolerances) on the corresponding bearing. Furthermore, altering angular location $\theta_P$ by significantly more than a couple degrees greater than the selected location causes a decrease in thickness of supplemented fluid film for the minimum design load angle. Thus, varying hybrid pad configuration forward or backward by a few angular degrees significantly alters the thickness of fluid film over the range of angles of each load F, and thus ultimately the ability to prevent a bearing touchdown under all load ranges under design. The selected angular locations $\theta_P$ allow each bearing to support a maximum load F over the various angular locations designed to see maximum load F, while still taking into account manufacturing tolerances in corresponding region R when locating and sizing each hybrid pad.

Above is described a first example embodiment of a gear pump with journal bearings having one or more hybrid pads. These have been shown through simulations to work well together and have increased performance with reduced risk of bearing touchdown. The results are summarized in Tables 1 and 2.

TABLE 1

Hybrid Pad Parameters:

| Bearing | Nominal Centerline Location | Minimum Leading Edge Location | Maximum Trailing Edge Location | Axial Distance from Gear Face (in/cm) | Pad Axial Length (in/cm) |
|---|---|---|---|---|---|
| Drive-Side Stationary 34 | $\theta_P(1) \approx 37°$ | $\theta_{Lmin}(1) \approx 31°$ | $\theta_{Tmax}(1) \approx 43°$ | $S_P(1) \approx$ 0.300/0.762 | $L_P(1) \approx$ 0.675/1.714 |
| Drive-Side Floating 35 | $\theta_P(2) \approx 37°$ | $\theta_{Lmin}(2) \approx 31°$ | $\theta_{Tmax}(2) \approx 43°$ | $S_P(2) \approx$ 0.300/0.762 | $L_P(2) \approx$ 0.675/1.714 |
| Driven-Side Stationary 36 | $\theta_P(3) \approx 46°$ | $\theta_{Lmin}(3) \approx 40°$ | $\theta_{Tmax}(3) \approx 52°$ | $S_P(3) \approx$ 0.300/0.762 | $L_P(3) \approx$ 0.675/1.714 |
| Drive-Side Floating 37 | $\theta_P(4) \approx 46°$ | $\theta_{Lmin}(4) \approx 40°$ | $\theta_{Tmax}(4) \approx 52°$ | $S_P(4) \approx$ 0.300/0.762 | $L_P(4) \approx$ 0.675/1.714 |

TABLE 2

Max Relief Parameters:

| Bearing | Pump Speed (RPM) | Radial Load (psig/kPa) | Load Angle Range | Film thickness w/o pad (µin) | Film thickness with pad (µin) |
|---|---|---|---|---|---|
| Drive-Side Stationary 34 | 8215 | F(1) ≈ 532/3668 | $\theta_F(1) \approx$ 43.4°-53.0° | 7.4 | 19.6 |
| Drive-Side Floating 35 | 8215 | F(2) ≈ 532/3668 | $\theta_F(2) \approx$ 43.4°-53.0° | 7.4 | 19.6 |
| Driven-Side Stationary 36 | 8215 | F(3) ≈ 636/4385 | $\theta_F(3) \approx$ 52.4°-64.0° | 5.9 | 15.1 |
| Drive-Side Floating 37 | 8215 | F(4) ≈ 636/4385 | $\theta_F(4) \approx$ 52.4°-64.0° | 5.9 | 15.1 |

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A journal bearing assembly comprising:
   a gear shaft;
   a gear mounted to the gear shaft, the gear including a first axial gear face;
   a first journal bearing disposed about a first longitudinal end of the gear shaft and spaced a first distance from the first axial gear face, the first journal bearing configured to support the gear shaft during rotation thereof, the gear shaft supported on a first fluid film formed annularly between an inner surface of the first journal bearing and an outer surface of the gear shaft during rotation thereof;
   a first hybrid pad recess at a first hybrid pad location circumferentially adjacent to a first fluid film location, the first hybrid pad recess having a minimum leading edge angular location on the first journal bearing of at least 31.0° in a direction of gear rotation measured relative to a first bearing flat; and
   a first porting path through a body of the first journal bearing providing high pressure fluid communication from a location outside the first journal bearing to the first hybrid pad recess for supplementing the first fluid film during rotation of the gear shaft;
   wherein the first porting path comprises:
      a discharge face cut on the first journal bearing for receiving the high pressure fluid from the location outside the first journal bearing;
      a radial spool cut on the first journal bearing;
      an axial hole through the first journal bearing for communicating the high pressure fluid from the discharge face cut to the radial spool cut; and
      a capillary port extending through the first journal bearing from the radial spool cut to the first hybrid pad recess for delivering the high pressure fluid from the radial spool cut to the first hybrid pad recess.

2. The journal bearing assembly of claim 1, wherein a centerline of the capillary port is axially spaced at least 0.537 inch (1.364 cm) from the first axial gear face.

3. The journal bearing assembly of claim 1, wherein the capillary port has a diameter of at least 0.023 inch (0.058 cm).

4. The journal bearing assembly of claim 1, wherein the first journal bearing is a drive-side stationary journal bearing or a drive-side pressure loaded bearing.

5. The journal bearing assembly of claim 1, wherein, in use, the first porting path is adapted to maintain a first hybrid pad at the first hybrid pad recess and supplement the first fluid film at the first fluid film location, the supplemented first fluid film adapted to support a radial load of approximately 532 lb$_f$/in$^2$ (3668 kPa) at or near the first hybrid pad.

6. The journal bearing assembly of claim 4, wherein the first hybrid pad recess is spaced at least 0.300 in (about 0.762 cm) from the first axial gear face.

7. The journal bearing assembly of claim 4, wherein the first hybrid pad recess has an axial length of at least 0.675 in (about 1.714 cm).

8. The journal bearing assembly of claim 1, wherein the fluid film is Jet A-1 fluid, and wherein the fluid is approximately 300° F. (149° C.) when entering the porting path.

9. The journal bearing assembly of claim 1, further comprising:
   a second journal bearing disposed about a second longitudinal end of the gear shaft and spaced a second distance from a second axial gear face opposite the first axial gear face, the second journal bearing configured to support the gear shaft during rotation thereof, the gear shaft supported on a second fluid film formed annularly between an inner surface of the second journal bearing and an outer surface of the gear shaft during rotation thereof;
   a second hybrid pad recess at a second hybrid pad location circumferentially adjacent to a second fluid film location, the second hybrid pad recess having a minimum leading edge angular location on the second journal bearing of at least 31.0° measured relative to a second bearing flat in the direction of gear rotation, and a maximum trailing edge angular location of no more than 43.0° measured relative to the second bearing flat in the direction of gear rotation; and
   a second porting path through a body of the second journal bearing providing high pressure fluid communication from a location outside the second journal bearing to the second hybrid pad recess for supplementing the second fluid film during rotation of the gear shaft;
   wherein the second porting path comprises:
      a discharge face cut on the second journal bearing for receiving the high pressure fluid from the location outside the second journal bearing;
      a radial spool cut on the second journal bearing;
      an axial hole through the second journal bearing for communicating the high pressure fluid from the discharge face cut to the radial spool cut; and
      a capillary port extending through the second journal bearing from the radial spool cut to the second hybrid pad recess for delivering the high pressure fluid from the radial spool cut to the second hybrid pad recess.

10. A journal bearing assembly comprising:
   a gear shaft;
   a gear mounted to the gear shaft, the gear including a first axial gear face;
   a first journal bearing disposed about a first longitudinal end of the gear shaft and spaced a first distance from the first axial gear face, the first journal bearing configured to support the gear shaft during rotation thereof, the gear shaft supported on a first fluid film formed annularly between an inner surface of the first journal bearing and an outer surface of the gear shaft during rotation thereof;
   a first hybrid pad recess at a first hybrid pad location circumferentially adjacent to a first fluid film location, the first hybrid pad recess having a maximum trailing edge angular location on the first journal bearing of no more than 52.0° in a direction of gear rotation measured relative to a first bearing flat; and a first porting path through a body of the first journal bearing providing high pressure fluid communication from a location outside the first journal bearing to the first hybrid pad recess for supplementing the first fluid film during rotation of the gear shaft;

wherein the first porting path comprises:
- a discharge face cut on the first journal bearing for receiving the high pressure fluid from the location outside the first journal bearing;
- a radial spool cut on the first journal bearing;
- an axial hole through the first journal bearing for communicating the high pressure fluid from the discharge face cut to the radial spool cut; and
- a capillary port extending through the first journal bearing from the radial spool cut to the first hybrid pad recess for delivering the high pressure fluid from the radial spool cut to the first hybrid pad recess.

11. The journal bearing assembly of claim 10, wherein a centerline of the capillary port is axially spaced at least 0.537 inch (1.364 cm) from the first axial gear face, and the capillary port has a diameter of at least 0.023 inch (0.058 cm).

12. The journal bearing assembly of claim 10, wherein the first journal bearing is a driven-side stationary journal bearing or a driven-side pressure loaded bearing.

13. The journal bearing assembly of claim 10, wherein, in use, the first porting path is adapted to maintain a first hybrid pad at the first hybrid pad recess and supplement a first fluid film at the first fluid film location, the supplemented first fluid film adapted to support a radial load of approximately 636 lb$_f$/in² (4385 kPa) at or near the first hybrid pad.

14. The journal bearing assembly of claim 13, wherein the first hybrid pad recess is spaced at least 0.300 in (about 0.762 cm) from the first axial gear face, and the first hybrid pad recess has an axial length of at least about 0.675 in (about 1.714 cm).

15. The journal bearing assembly of claim 10, wherein a maximum diametral clearance between the inner surface of the first journal bearing and the outer surface of the gear shaft, during rotation thereof, is approximately 0.0039 inch (0.00991 cm).

16. The journal bearing assembly of claim 10, wherein supplementing the fluid film with the high pressure lubricant increases a thickness of the fluid film by approximately 0.0000092 inch (0.000023 cm) at or near the hybrid pad recess.

17. The journal bearing assembly of claim 10, further comprising:
- a second journal bearing disposed about a second longitudinal end of the gear shaft and spaced a second distance from a second axial gear face opposite the first axial gear face, the second journal bearing configured to support the gear shaft during rotation thereof, the gear shaft supported on a second fluid film formed annularly between an inner surface of the second journal bearing and an outer surface of the gear shaft during rotation thereof;
- a second hybrid pad recess at a second hybrid pad location circumferentially adjacent to a second fluid film location, the second hybrid pad recess having a minimum leading edge angular location on the second journal bearing of at least 31.0° measured relative to a second bearing flat in the direction of gear rotation, and a maximum trailing edge angular location of no more than about 43.0° measured relative to the second bearing flat in the direction of gear rotation; and
- a second porting path through a body of the second journal bearing providing high pressure fluid communication from a location outside the second journal bearing to the second hybrid pad recess for supplementing the second fluid film during rotation of the gear shaft; wherein the second porting path comprises:
  - a discharge face cut on the second journal bearing for receiving the high pressure fluid from the location outside the second journal bearing;
  - a radial spool cut on the second journal bearing;
  - an axial hole through the second journal bearing for communicating the high pressure fluid from the discharge face cut to the radial spool cut; and
  - a capillary port extending through the second journal bearing from the radial spool cut to the second hybrid pad recess for delivering the high pressure fluid from the radial spool cut to the second hybrid pad recess.

* * * * *